(12) United States Patent
Bergstrom et al.

(10) Patent No.: US 10,991,036 B1
(45) Date of Patent: Apr. 27, 2021

(54) AUTOMATIC MAPPING OF STORE LAYOUT USING SOFT OBJECT RECOGNITION

(71) Applicants: WALGREEN CO., Deerfield, IL (US); The Trustees of the University of Pennsylvania, Philadelphia, PA (US)

(72) Inventors: John M. Bergstrom, Palatine, IL (US); Jonas Cleveland, Plainfield, NJ (US); Dinesh Thakur, Philadelphia, PA (US); Philip Dames, Philadelphia, PA (US); Cody Philips, Philadelphia, PA (US); Terry Kientz, Williamstown, NJ (US); Kostas Daniilidis, Wynnewood, PA (US); Vijay Kumar, Wilmington, DE (US)

(73) Assignees: WALGREEN CO., Deerfield, IL (US); The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 16/883,655

(22) Filed: May 26, 2020

Related U.S. Application Data

(63) Continuation of application No. 15/158,464, filed on May 18, 2016, now Pat. No. 10,733,661.
(Continued)

(51) Int. Cl.
*G06Q 30/06* (2012.01)
*G06Q 10/08* (2012.01)
*G06Q 20/20* (2012.01)

(52) U.S. Cl.
CPC ..... *G06Q 30/0639* (2013.01); *G06Q 30/0643* (2013.01); *G06Q 10/08* (2013.01); *G06Q 20/20* (2013.01)

(58) Field of Classification Search
CPC .......... G06Q 30/0639; G06Q 30/0643; G06Q 10/08; G06Q 20/20
(Continued)

(56) References Cited

U.S. PATENT DOCUMENTS 8,049,621 B1 11/2011 Egan
8,447,863 B1 * 5/2013 Francis, Jr. ......... G06F 16/2468
709/226

(Continued)

OTHER PUBLICATIONS

Cleveland, Jonas, et al. "An automated system for semantic object labeling with soft object recognition and dynamic programming segmentation." 2015 IEEE International Conference on Automation Science and Engineering (CASE) (Aug. 2015).
(Continued)

*Primary Examiner* — Florian M Zeender
*Assistant Examiner* — Nicole Elena Bruner
(74) *Attorney, Agent, or Firm* — Marshall, Gerstein & Borun LLP; Randall G. Rueth

(57) ABSTRACT

A method for automatically mapping a store layout includes identifying a path for traversing a retail area and capturing images of the retail area at various points along the path. The images may be analyzed to identify visual characteristics which may be compared to a template of retail products in a template library. When an object depicted in the image matches with a retail product in the template library, the object may correspond to the retail product. Additionally, a retail department for the object may also be identified. The retail department may be compared to the retail product corresponding to the object, and when the retail product is not associated with the retail department, another retail product which is associated with the retail department may be identified as corresponding to the object. A map of the store layout may be generated based on the identified retail products.

20 Claims, 15 Drawing Sheets

Related U.S. Application Data

(60) Provisional application No. 62/165,844, filed on May 22, 2015.

(58) Field of Classification Search
USPC .......................................................... 705/26.9
See application file for complete search history.

(56) References Cited

U.S. PATENT DOCUMENTS

| | | | | |
|---|---|---|---|---|
| 8,983,865 | B1* | 3/2015 | Murphy | G06Q 10/101 |
| | | | | 705/28 |
| 2006/0178953 | A1* | 8/2006 | Aggarwal | G06Q 10/087 |
| | | | | 705/28 |
| 2008/0077511 | A1* | 3/2008 | Zimmerman | G06Q 10/00 |
| | | | | 705/28 |
| 2009/0059270 | A1* | 3/2009 | Opalach | G06Q 10/087 |
| | | | | 358/1.15 |
| 2012/0005222 | A1 | 1/2012 | Bhagwan et al. | |
| 2012/0323620 | A1 | 12/2012 | Hofman et al. | |
| 2013/0103608 | A1* | 4/2013 | Scipioni | G06Q 30/0281 |
| | | | | 705/346 |
| 2014/0003727 | A1 | 1/2014 | Lortz et al. | |
| 2015/0046299 | A1* | 2/2015 | Yan | G06Q 10/087 |
| | | | | 705/28 |
| 2015/0052029 | A1* | 2/2015 | Wu | G06Q 10/087 |
| | | | | 705/28 |
| 2015/0193982 | A1 | 7/2015 | Mihelich et al. | |
| 2015/0268058 | A1 | 9/2015 | Samarasekera et al. | |
| 2015/0363625 | A1* | 12/2015 | Wu | G06K 9/00664 |
| | | | | 382/203 |
| 2015/0363758 | A1 | 12/2015 | Wu et al. | |
| 2015/0365660 | A1 | 12/2015 | Wu et al. | |
| 2016/0134930 | A1 | 5/2016 | Swafford | |
| 2016/0171707 | A1 | 6/2016 | Schwartz | |

OTHER PUBLICATIONS

U.S. Appl. No. 13/842,858, filed Mar. 15, 2013.
U.S. Appl. No. 14/505,887, filed Oct. 3, 2014.
U.S. Appl. No. 14/505,898, filed Oct. 3, 2014.
U.S. Appl. No. 14/505,901, filed Oct. 3, 2014.
U.S. Appl. No. 15/158,376, filed May 18, 2016.
U.S. Appl. No. 15/158,464, filed May 18, 2016.
Office Action for U.S. Appl. No. 15/158,464, dated Dec. 31, 2018.
Office Action for U.S. Appl. No. 15/158,464, dated Mar. 22, 2019.
Office Action for U.S. Appl. No. 15/158,464, dated Sep. 20, 2019.

* cited by examiner

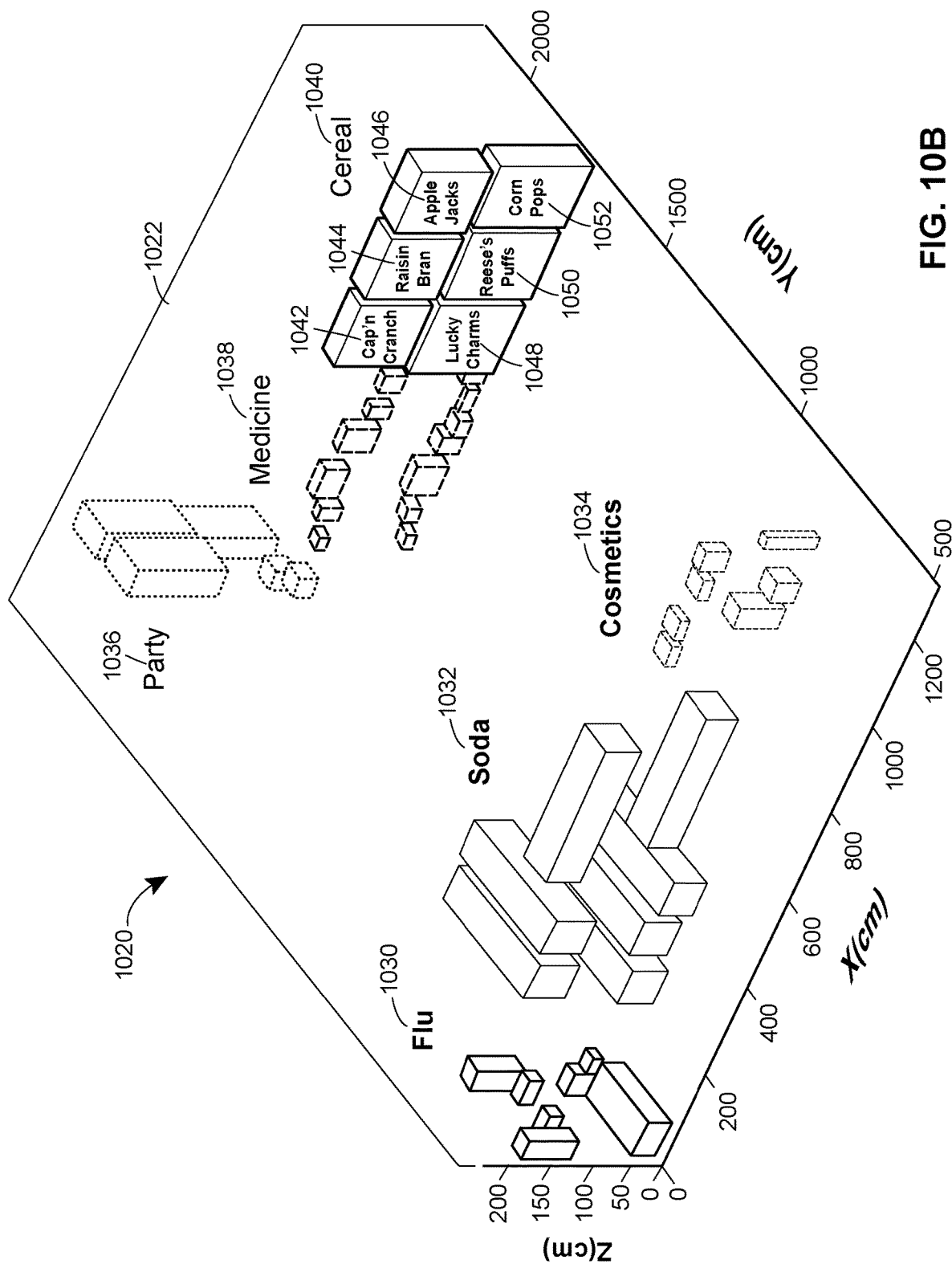

US 10,991,036 B1

AUTOMATIC MAPPING OF STORE LAYOUT USING SOFT OBJECT RECOGNITION

CROSS-REFERENCE TO RELATED APPLICATIONS

This application is a continuation of U.S. 1 patent application Ser. No. 15/158,464 entitled "AUTOMATIC MAPPING OF STORE LAYOUT USING SOFT OBJECT RECOGNITION," filed on May 18, 2016, which claims priority to and the benefit of the filing date of U.S. Provisional Patent Application No. 62/165,844 entitled "AUTOMATIC MAPPING OF STORE LAYOUT USING SOFT OBJECT RECOGNITION," filed on May 22, 2015, the entire contents of each of which is hereby expressly incorporated by reference.

TECHNICAL FIELD

The instant disclosure generally relates to improving a retail area and, in particular, to systems and methods for automatically gathering data about store layouts and generating store layout maps.

BACKGROUND

To increase profits and improve customer experience, retailers often develop diagrams that specify where and in what quantity items should be placed on shelves, pegs, in vending machine slots, or other merchandizing fixtures. These diagrams are known as planograms or POGs. In general, to develop a planogram, a planner selects several items for inclusion in a planogram (known as item or product assortment) and determines relative placement of these items within the planogram (known as item layout). While a relatively effective planogram for two or three items may be quickly generated by simply trying various combinations and relying on subjective judgment, developing a quality planogram for tens or hundreds of items is a highly complicated task.

Moreover, retailers often operate hundreds or thousands of stores or retail areas, where each of the stores has a unique arrangement of merchandizing fixtures (e.g., shelves and floor space). In order to develop planograms for each of these stores, a retailer needs: (i) an accurate mapping of the physical arrangement of merchandizing fixtures at each of the stores; and (ii) an accurate labeling of the mapping which indicates where certain types of products are currently placed within a store. In many cases, store managers or employees are tasked with manually providing such a labeled mapping to a retailer (e.g., by physically walking through the store and recording the location of product types). However, manual generation of labeled mappings is time intensive and often results in erroneous or out-of-date mappings of retail areas and planograms that are inconsistent with actual store layouts. A retailer can lose significant amounts of money if a cycle of error prone store mapping and inconsistent planograms generation persists, not to mention creating employee frustrations with planogram related miscommunications.

SUMMARY

To efficiently and accurately map a store layout, a layout mapping system may create an optimal path for an autonomous vehicle to navigate the entire retail area and capture images of the merchandizing fixtures. The layout mapping system may also identify each of several objects on the merchandizing fixtures as various retail products and generate a map of the retail area.

More specifically, the autonomous vehicle may obtain an occupancy grid map of the retail area which is a two-dimensional (2D) overhead view of each of the merchandizing fixtures in the retail area and their respective locations within the retail area. Based on the occupancy grid map, the autonomous vehicle may identify several waypoints which may be traversed by the autonomous vehicle to capture images of each of the merchandizing fixtures in the retail area. The waypoints may be along the perimeters of the merchandizing fixtures. For example, if the merchandizing fixtures are rectangular, the autonomous vehicle may navigate to all four sides of each merchandizing fixture to capture images of the entire merchandizing fixture.

In any event, the autonomous vehicle may determine an optimal path for traversing the retail area based on the waypoints, where the autonomous vehicle navigates to every waypoint while covering a minimum total distance. The autonomous vehicle may then traverse the entire retail area according to the optimal path and capture three-dimensional (3D) images of the merchandizing fixtures at each of the waypoints.

The 3D images may then be analyzed to identify the retail products on the merchandizing fixtures and their respective locations within the retail area. To identify retail products, the layout mapping system may identify boundaries of one or more objects within each image. For each of the identified objects, the layout mapping system may identify visual descriptors for the object which include keypoints within an image that may uniquely identify the object. The layout mapping system may also identify semantic cues for the object, such as text displayed on the object, a tag on or adjacent to the object, a pattern or symbol on the object, etc. Additionally, the layout mapping system may identify the size and shape of the object or any other visual characteristics of the object which may be used to identify a retail product which corresponds to the object. Each of these visual descriptors and semantic cues may be compared to templates of retail products to determine a likelihood that the object corresponds to one of the retail products. In some embodiments, when an object is compared to a template of a retail product, each visual descriptor and each semantic cue for the object may be compared to the template of the retail product to determine a likelihood that the object corresponds to the retail product. The likelihoods based on each of the visual descriptors and each of the semantic cues may then be aggregated or combined in any suitable manner to determine an overall likelihood that the object corresponds to the retail product.

In any event, when the likelihood that the object corresponds to the retail product exceeds a predetermined likelihood threshold or the likelihood is greater than the other likelihoods that the object corresponds to other retail products, the layout mapping system may determine that the object is the retail product. Accordingly, the retail product may be displayed in the map of the retail area. In some embodiments, the layout mapping system may identify a retail department for the object. For example, the retail department for the object may be determined based on retail departments for the object's neighbors. When the retail department for the object does not match with the identified retail product for the object, the layout mapping system may adjust the likelihood that the object corresponds to the retail product and/or determine that the object corresponds to a different retail product. For example, if the layout mapping system determines the likelihood that the object is Pepsi® is 55 percent, the likelihood that the object is a type of shampoo is 45 percent, and the retail department for the object is bath and body products, the layout mapping system may determine that the object is a shampoo, because shampoo is a bath and body product while Pepsi® is a soft drink.

In this manner, the autonomous vehicle may traverse the retail area in an efficient manner covering a minimum distance or time. By covering a minimum distance or time in the traversal, the autonomous vehicle may save battery power maximizing the number of traversals performed by the autonomous vehicle before the battery needs to be charged. Moreover, by capturing 3D images of the merchandizing fixtures and analyzing the 3D images to identify visual descriptors of objects which may be compared to templates of retail products, the present embodiments provide an accurate mapping for a store layout. By identifying retail departments and comparing the retail department to an identified retail product for the object, the present embodiment advantageously allow for an increased accuracy in identifying retail products based on the way in which a retail area is typically organized.

In one embodiment, a method for automatically mapping a store layout is provided. The method includes receiving a three-dimensional image depicting one or more merchandizing fixtures within a retail area, identifying visual characteristics within an object on the one or more merchandizing fixtures, and determining likelihoods that the object corresponds to a plurality of retail products by comparing the visual characteristics of the object to visual characteristics for each of the plurality of retail products. The method further includes determining distances from the object to retail products neighboring the object, identifying retail departments corresponding to the retail products neighboring the object, and determining a retail department for the object based on the distances from the object to the retail products neighboring the object. Moreover, the method includes adjusting the likelihoods that the object corresponds to the plurality of retail products by comparing the retail department for the object to retail departments for the plurality of retail products, determining a retail product for the object having a highest adjusted likelihood of the adjusted likelihoods that the object corresponds to the plurality of retail products, and generating a map of a store layout for the retail area including an indication of the determined retail product within the retail area.

In another embodiment, a system for automatically mapping a store layout is provided. The system includes one or more processors and a non-transitory computer-readable memory coupled to the one or more processors and storing instructions thereon. When executed by the one or more processors, the instructions cause the system to receive a three-dimensional image depicting one or more merchandizing fixtures within a retail area, identify visual characteristics within an object on the one or more merchandizing fixtures, and determine likelihoods that the object corresponds to a plurality of retail products by comparing the visual characteristics of the object to visual characteristics for each of the plurality of retail products. The instructions further cause the system to determine distances from the object to retail products neighboring the object, identify retail departments corresponding to the retail products neighboring the object, and determine a retail department for the object based on the distances from the object to the retail products neighboring the object. Moreover, the instructions cause the system to adjust the likelihoods that the object corresponds to the plurality of retail products by comparing the retail department for the object to retail departments for the plurality of retail products, determine a retail product for the object having a highest adjusted likelihood of the adjusted likelihoods that the object corresponds to the plurality of retail products, and generate a map of a store layout for the retail area including an indication of the determined retail product within the retail area.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 10B illustrates an exemplary 3D map of a store layout;

DETAILED DESCRIPTION

Figure 1:
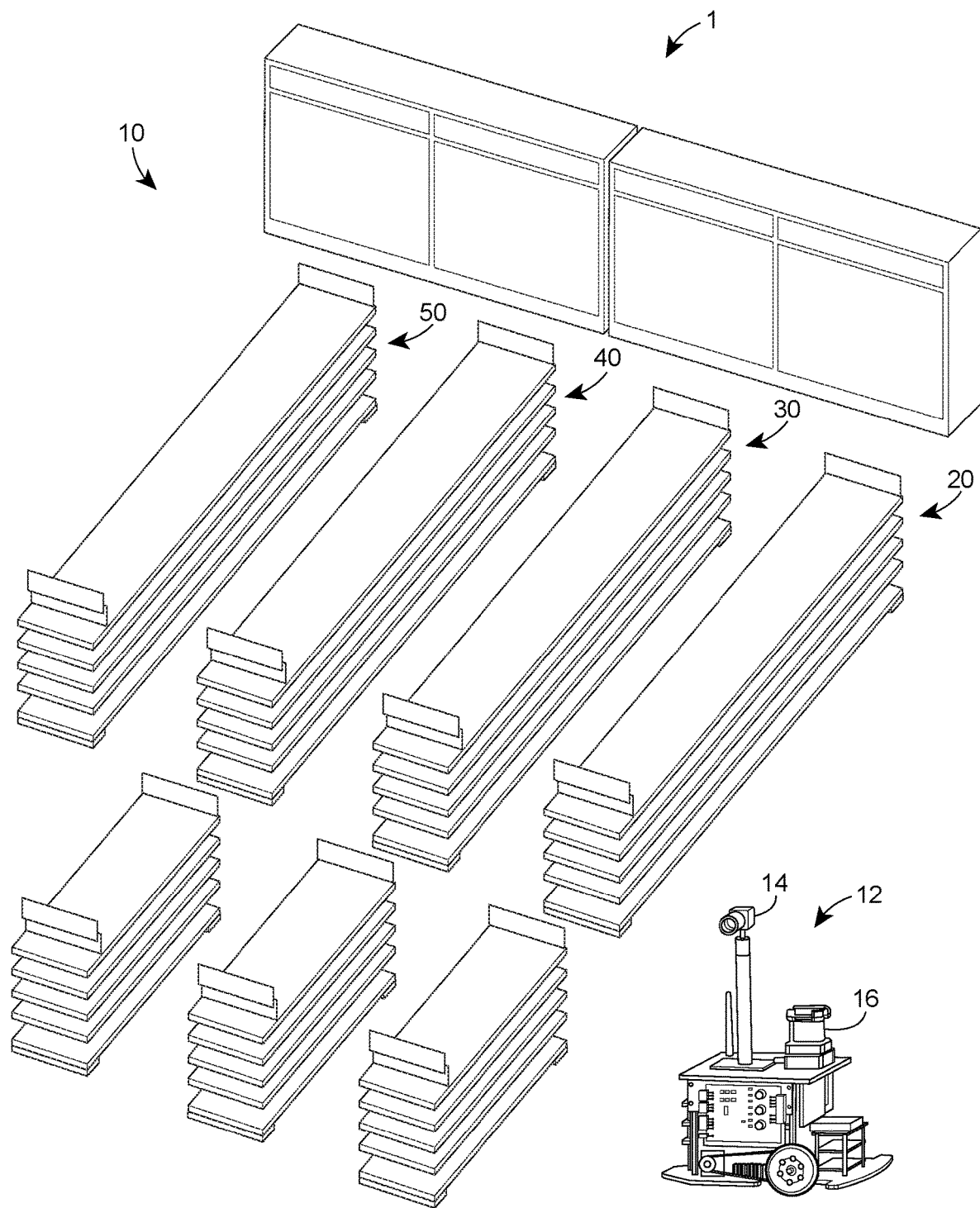
FIG. 1 illustrates an example retail environment in which the techniques of the present disclosure can be used to automatically map a store layout.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Accordingly, the term "merchandizing fixture" may be used to refer to a device for displaying retail products in a store. For example, a merchandizing fixture may be a shelving unit including one or several shelves spaced vertically above and below each other. The merchandizing fixture may also be a table, a display case, or any other suitable device for displaying retail products.

The term "waypoint" as used herein may be used to refer to a location within the retail area which may be traversed by an autonomous vehicle. For example, waypoints may be along the perimeter of merchandizing fixtures, such that the autonomous vehicle may capture images of the merchandizing fixtures from the waypoints. The waypoints also may be spaced a predetermined amount apart from each other, such that the autonomous vehicle may capture images of an entire side of a merchandizing fixture by capturing images at the waypoints which correspond to the side. Moreover, the waypoints may be a predetermined distance away from the perimeter of the merchandizing fixture, such that the autonomous vehicle may capture images of the merchandizing fixture which have a height that is greater than a predetermined height, for example.

The term "edge" as used herein may be used to refer to a path between an ordered or unordered pair of waypoints. For example, the path from waypoint A to waypoint B may be an edge. An edge may be displayed as an arc, a line, and/or any other suitable indication of a connection between nodes.

The term "three-dimensional (3D) image" as used herein may be used to refer to a group of pixels (which may be black and white, grayscale, red, green, blue (RGB) pixels, etc.) with 3D coordinates. For example, the 3D coordinates may be generated by a two-dimensional (2D) camera image captured from a known location within a 3D space. In another example, the position of each pixel within an image may be determined using a camera-depth sensor, such as an Xbox One™ Kinect® sensor.

Generally speaking, techniques for automatically mapping a store layout may be implemented in an autonomous vehicle, one or several network servers or a system that includes a combination of these. However, for clarity, the examples below focus primarily on an embodiment in which an autonomous vehicle obtains an occupancy grid map for a retail area and determines an optimal path for traversing the retail area based on the occupancy grid map to capture 3D images of the merchandizing fixtures. The autonomous vehicle then traverses the retail area according to the optimal path while capturing 3D images of the merchandizing fixtures. The 3D images may be transmitted to a server device which analyzes the 3D images to identify objects within each image and visual descriptors as well as semantic cues for the objects. The server device may then compare the visual descriptors and semantic cues for the objects to templates for retail products to identify a retail product which corresponds to the object. When a retail product has been identified for each object, the server device may generate and display a map of the store layout. In other embodiments, the server device may determine an optimal path for traversing the retail area, and in yet other embodiments, the autonomous vehicle may analyze the 3D images to generate a map of the store layout.

System Overview

FIG. 1 illustrates an example retail environment 1 for automatically mapping a store layout. The retail environment 1 may include a retail area 10 having several merchandizing fixtures 20-60 each including several shelves. The retail environment 1 may also include an autonomous vehicle 12 for traversing the retail area and capturing images. The autonomous vehicle 12 may include one or more cameras 14, a laser scanning device 16, and a depth sensor (not shown). The retail environment 1 may also include a docking station (not shown) which may receive the captured images from the autonomous vehicle 12 and transmit the captured images to a server device. In some embodiments, the docking station may be the server device, a portion of the server device, or one of several server devices. Additionally, the autonomous vehicle 12 may navigate to the docking station, when the autonomous vehicle finishes traversing the retail area, and the docking station may charge the autonomous vehicle 12.

Figure 2:
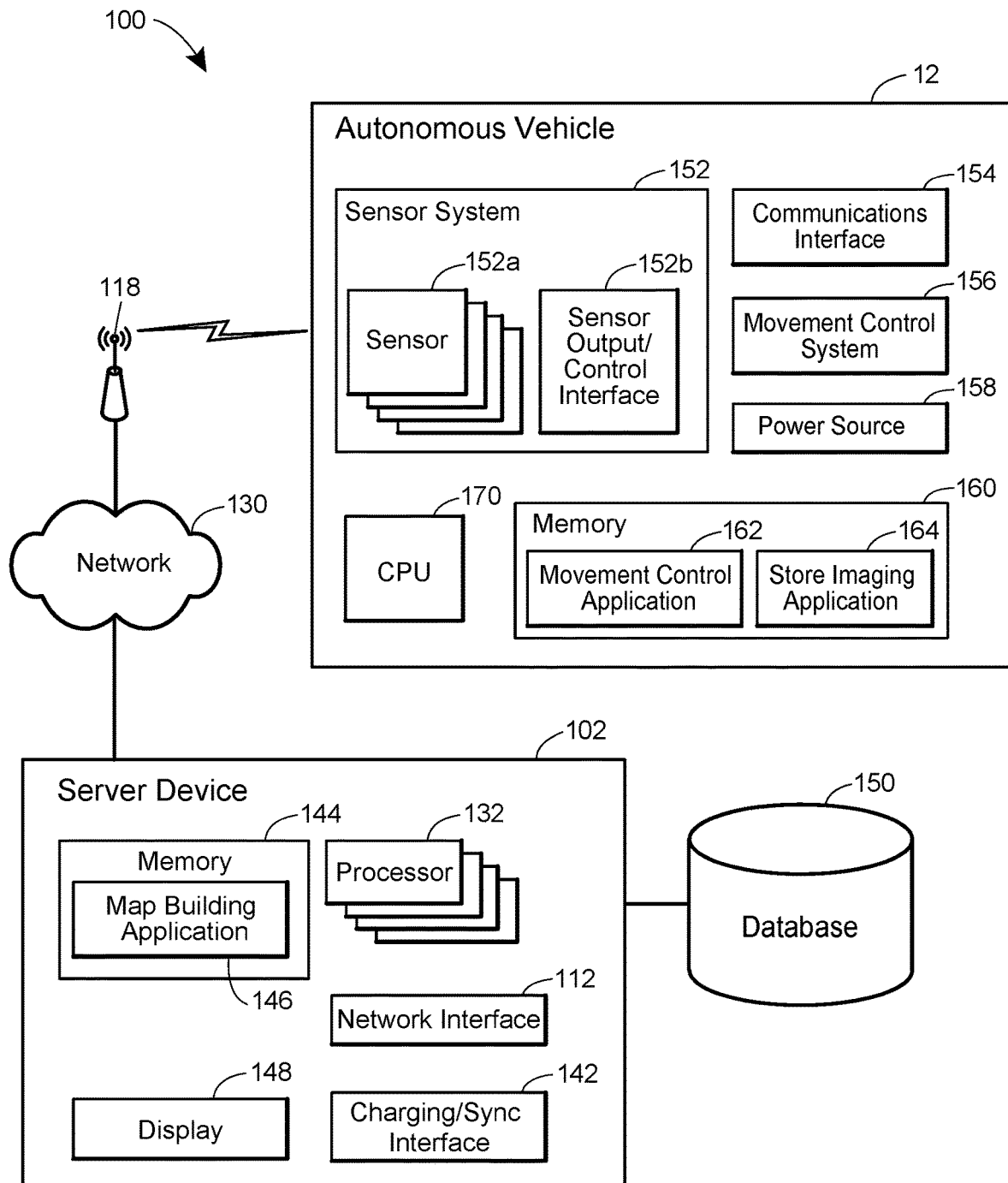
FIG. 2 is a block diagram of an exemplary system for automatically mapping a store layout.

FIG. 2 illustrates an example system 100 for automatically mapping a store layout. The system 100 may include an autonomous vehicle 12 and a sever device 102 which may be communicatively connected through a network 130, as described below. According to embodiments, the server device 102 may be a combination of hardware and software components, also as described in more detail below. The server device 102 may have an associated database 150 for storing data related to the operation of the system 100 (e.g., occupancy grid maps, templates of retail products, locations of retail departments, etc.). Moreover, the server device 102 may include a display 148, a network interface 112, a charging and synchronization interface 142, an input/output circuit (not shown) and one or more processor(s) 132 such as a microprocessor coupled to a memory 144, all of which may be interconnected via an address/data bus (not shown).

The memory 144 may be tangible, non-transitory memory and may include any types of suitable memory modules, including random access memory (RAM), read-only memory (ROM), flash memory, other types of persistent memory, etc. The memory modules may be implemented as semiconductor memories, magnetically readable memories, and/or optically readable memories. The memory 144 may store, for example instructions executable on the processors 132 for a map building application 146. The memory may also store instructions for other various applications executable on the processors 132. For example, a user interface application may provide a user interface on the display 148 of the server device 102, which user interface may, for example display a generated map of the store layout.

To automatically map a store layout, the map building application 146 may receive, via the network interface 112, captured images of merchandizing fixtures from the autonomous vehicle 12. The map building application 146 may perform an image analysis of the captured images to identify boundaries of one or more objects within the captured images. For each of the identified objects, the layout mapping system may identify visual descriptors of the object, which include keypoints within an image that may uniquely identify the object. The layout mapping system may also identify semantic cues for the object, such as text displayed on the object, a tag on or adjacent to the object, a pattern or symbol on the object, etc. Additionally, the layout mapping system may identify the size and shape of the object or any other visual characteristics of the object which may be used to identify a retail product which corresponds to the object.

Each of these visual descriptors and semantic cues may be compared to templates of retail products to determine a likelihood that the object corresponds to one of the retail products. When the likelihood that the object corresponds to the retail product exceeds a predetermined likelihood threshold or the likelihood is greater than the other likelihoods that the object corresponds to other retail products, the map building application 146 may determine that the object is the retail product. In some embodiments, each likelihood may range from zero percent to one hundred percent and may be a confidence value corresponding to a percentage that the object is the retail product. For example, if the layout mapping system determines the likelihood that the object is Pepsi® is one hundred percent, there may be a one hundred percent chance that the object is Pepsi®. On the other hand, if the layout mapping system determines the likelihood that the object is Pepsi® is zero percent, there may be a zero percent chance that the object is Pepsi®.

The map building application 146 may then generate a map of the store layout including each of the identified retail objects displayed at the locations of the corresponding objects. The map may be presented on the display 148 of the server device 102 or may be transmitted to be displayed on another computing device, such as a desktop computer, a laptop computer, a tablet computer, a smart phone, a wearable computing device, etc. In other embodiments, the map building application 146 may be included in the autonomous vehicle 12 and/or a combination of the server device 102 and the autonomous vehicle 12.

In some embodiments, the server device 102 may be a docking station for charging the autonomous vehicle 12. The server device 102 may include a charging and synchronization interface 142 that may allow the autonomous vehicle to be removably connected to the server device 102. For example, before and after gathering data in the retail area, the autonomous vehicle 12 may navigate to the server device 102 and establish a physical connection (e.g., via Ethernet jack, USB interface, or other port) with the server device 102. Such a physical connection may allow the server device 102 to recharge the power source 158, retrieve data from the autonomous vehicle 12, and/or diagnose problems in the autonomous vehicle 12.

The autonomous vehicle 12 may be, in an implementation, a robotic or other electro-mechanical or virtual agent, which operates autonomously or semi-autonomously. The autonomous vehicle 12 may include one or more automated operation features capable of operating the autonomous vehicle 12 in the absence of or without operating input from a vehicle operator. The autonomous vehicle 12 may be: (i) an airborne robotic device, such as a quadrotor robot or other unmanned aerial vehicle or drone; (ii) a ground-based robotic device, such as a rolling, crawling, or walking robot; (iii) a steerable camera device or other motion control photography device; or (iv) any suitable vehicle having motion control and imaging capabilities.

The autonomous vehicle 12 may include a sensor system 152 with one or more sensors 152a and a sensor output/control interface 152b. For example, the one or more sensors 152a may include motion sensors, such as accelerometers, gyroscopes, and magnetometers, such as those including micro-electro-mechanical systems (MEMS). Additionally, the one or more sensors 152a may include a laser scanning device such as the laser scanning device 16 as shown in FIG. 1, for detecting objects which obstruct the path of the autonomous vehicle. The laser scanning device may be a Light Detection and Ranging (LIDAR) sensor, or any other suitable laser scanning device.

In any event, using data generated by sensors, the autonomous vehicle 12 may navigate through a retail store, avoid obstacles while navigating, and/or stabilize. The one or more sensors 152a may also include one or more cameras, such as digital cameras capable of capturing images and videos of a retail area. In some embodiments, each of the one or more cameras may be in the same orientation relative to the autonomous vehicle 12. For example, each of the one or more cameras may capture images depicting merchandizing fixtures to the right of the autonomous vehicle. In another example, each of the one or more cameras may capture images depicting merchandizing fixtures to the left of the autonomous vehicle, in front of the autonomous vehicle, or behind the autonomous vehicle. In other embodiments, the one or more cameras may have different orientations relative to the autonomous vehicle 12. For example, one of the cameras may capture images depicting merchandizing fixtures to the right of the autonomous vehicle 12, and another of the cameras may capture images depicting merchandizing fixtures to the left of the autonomous vehicle 12. Moreover, the one or more sensors 152a may include depth sensors capable of detecting the depth of objects in the images, such as an Xbox One™ Kinect® sensor. Data from the one or more sensors 152a may be output to the sensor output/control interface 152b, which may include any suitable hardware and/or software data acquisition components, and may be communicated from the autonomous vehicle 12 to the server device 102 via the communications interface 154.

According to control signaling by a movement control application 162, the autonomous vehicle 12 may move, or travel, through a retail area via a movement control system 156. The movement control system 156 may include one or more electronic components, such as microprocessors, integrated circuits, etc., that process signals (e.g., analog or digital signals) from the movement control application 162 and control one or more mechanical operations of the autonomous vehicle 12. For example, if the autonomous vehicle 12 is a quadrotor robot, the movement control system 156 may receive signals from the movement control application 162 to increase or decrease the rotation of one or more rotors, increase/decrease the tilt of rotors, etc. Alternatively, if the autonomous vehicle 12 is a ground-based rolling robot, the movement control system 156 may receive signals from the movement control application 162 to turn wheels right or left, accelerate, decelerate, etc.

The autonomous vehicle 12 may power mechanical and electrical components, such as components of the sensor system 152, communications interface 154, and movement control system 156, via a power source 158. The power source 158 may include one or more batteries, fuel cells, etc.

Moreover, the autonomous vehicle 12 may include an input/output circuit (not shown), one or more processors(s) 170 such as a microprocessor coupled to a memory 160, all of which may be interconnected via an address/data bus (not shown). The memory 160 may include an operating system, a data storage, a plurality of software applications, and/or a plurality of software routines. The operating system, for example, may include Microsoft Windows®, OS X®, Linux®, Unix®, etc. The data storage may include data such as an occupancy grid map, application data for the plurality of applications, routine data for the plurality of routines, and/or other data necessary to interact with the server 102 through the digital network 130. In some embodiments, the processors 170 may also include, or otherwise be communicatively connected to, other data storage mechanisms (e.g., one or more hard disk drives, optical storage drives, solid state storage devices, etc.) that reside within the autonomous vehicle 12.

Similar to the memory 144 in the server device 102, the memory 160 may be tangible, non-transitory memory and may include any types of suitable memory modules, including random access memory (RAM), read-only memory (ROM), flash memory, other types of persistent memory, etc. The memory modules may be implemented as semiconductor memories, magnetically readable memories, and/or optically readable memories. As mentioned above, the memory 160 may store, for example instructions executable on the processors 170 for a plurality of software applications, including a movement control application 162 and a store imaging application 164. Each of these applications may include several routines, as described in more detail below.

To identify an optimal path for traversing the retail area, the movement control application 162 may obtain an occupancy grid map of the retail area, assign several waypoints to various locations within the retail area, and determine a path for traversing each of the waypoints while minimizing a total distance traveled on the path. The movement control application 162 may then transmit control signals to the movement control system 156 to control the mechanical operation of the autonomous vehicle 12 so that the autonomous vehicle 12 follows the path. Additionally, the movement control application 162 may receive signals from the sensor system 152. For example, the movement control application 162 may receive signals from the laser scanning device, and when the laser scanning device detects an object on the path, the movement control application 162 may transmit control signals to the movement control system 156 for avoiding the object. Once the object has successfully been avoided, the movement control application 162 may transmit control signals for continuing along the path.

When the autonomous vehicle 12 reaches one of the waypoints, a store imaging application 164 may capture images of one of the merchandizing fixtures in the retail area via the cameras and/or depth sensors included in the sensor system 152. In some embodiments, the captured images may be 3D images including several points in a 3D point cloud based on red, green, blue—depth (RGB-D) sensor data from the cameras and depth sensors. The store imaging application 164 may transmit the images via the network 130 to the server device 102 as the images or captured, or may transmit the images to the server device 102 after traversing the entire retail area. In other embodiments, the autonomous vehicle 12 may capture images at a fixed rate in addition or as an alternative to capturing images at the waypoints. For example, as the autonomous vehicle 12 navigates from a first waypoint to a second waypoint, the store imaging application 164 may capture images every 0.3 meters, every 0.6 meters, every meter, etc. in between the first and second waypoints.

The autonomous vehicle 12 need not necessarily communicate with the network 130 via a wired connection. In some instances, the autonomous vehicle 12 may communicate with the network 130 via wireless signals and, in some instances, may communicate with the network 130 via an intervening wireless or wired device 118, which may be a wireless router, a wireless repeater, a base transceiver station of a mobile telephony provider, etc. For example, the autonomous vehicle 12 may establish wireless communications with the wireless access point 118 via a cellular communication link or wireless local area network (WLAN) or Wi-Fi™ link (using a protocol corresponding to an IEEE 802.11 standard), and the communicative connections between the wireless access point 118, the network 130, and the server device 102 may include any suitable combination of wired connections, such as twisted pair cables, coaxial cables, ribbon cables, etc.

It will be appreciated that although only one server device 102 is depicted in FIG. 2, multiple servers 102 may be provided for the purpose of distributing server load, serving different web pages, etc. These multiple servers 102 may include a web server, an entity-specific server (e.g., an Apple® server, etc.), a server that is disposed in a retail or proprietary network, etc. For example, the multiple servers 102 may include a docking station which receives data (e.g., captured images) from the autonomous vehicle 12 while the autonomous vehicle 12 is removeably connected to the docking station. The docking station may then transmit the data to another server device 102 in a remote location via the network 130.

As mentioned above, the server device 102 may communicate with the autonomous vehicle 12 via the network 130. The digital network 130 may be a proprietary network, a secure public Internet, a local area network (LAN), a wide area network (WAN), a virtual private network (VPN) or some other type of network, such as dedicated access lines, plain ordinary telephone lines, satellite links, combinations of these, etc. Where the digital network 130 comprises the Internet, data communication may take place over the digital network 130 via an Internet communication protocol.

The layout mapping system may include two portions: (i) a navigation portion for determining an optimal path for the autonomous vehicle to navigate through a retail area; and (ii) a map generation portion for mapping the layout of the retail area.

Navigation

Figure 3A:
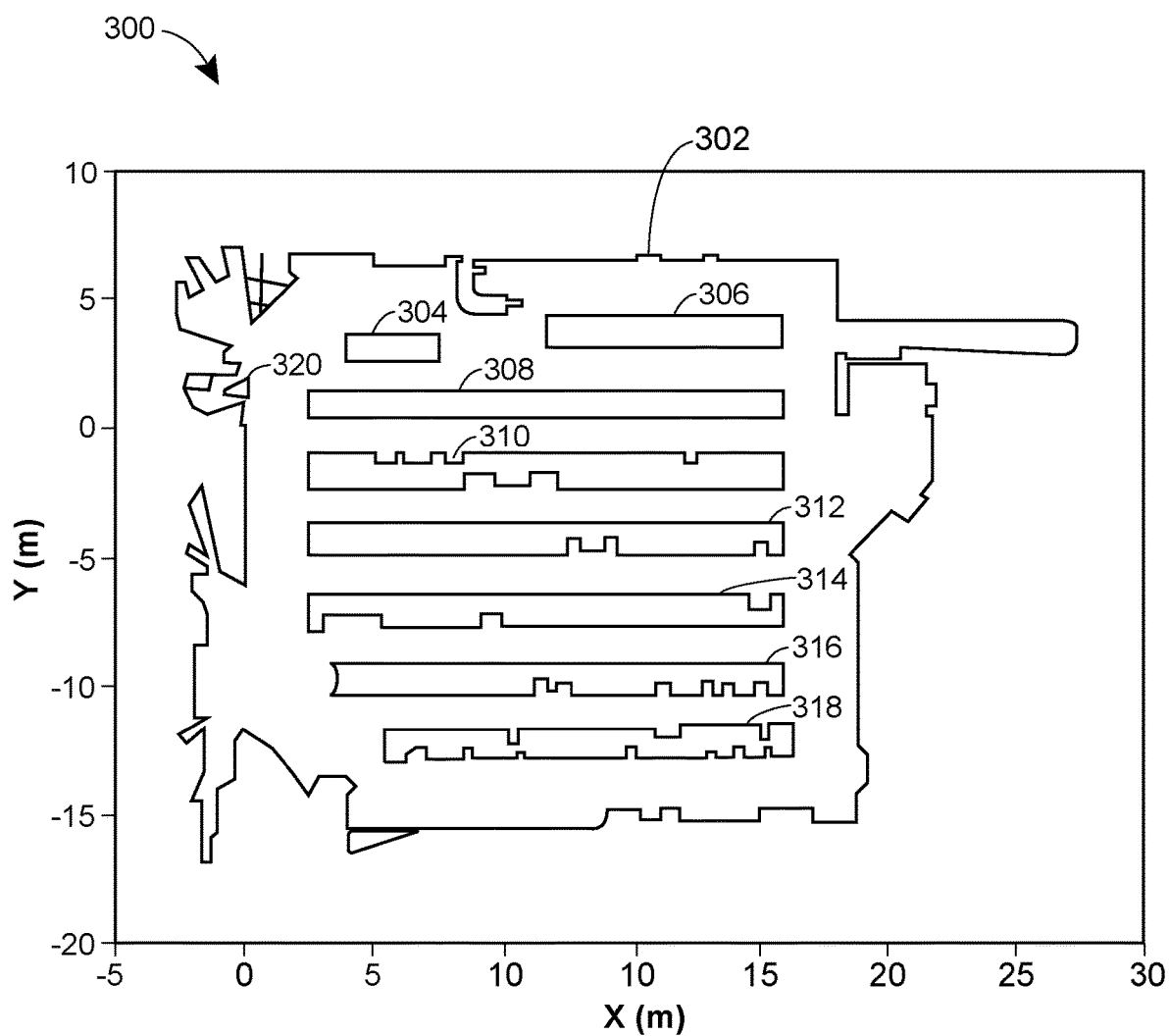
FIG. 3A illustrates an exemplary occupancy grid map of a retail area for identifying a path for traversing the retail area.

To determine an optimal path for navigating through the retail area, the autonomous vehicle 12 may obtain an occupancy grid map of the retail area. FIG. 3A illustrates an exemplary occupancy grid map 300 which displays a 2D overhead view of each of the merchandizing fixtures in the retail area and their respective locations within the retail area. The occupancy grid map 300 may include an overhead view of the retail area 302 and each of the merchandizing fixtures 304-318 within the retail area 302. Additionally, the occupancy grid map 300 may include locations of the merchandizing fixtures 304-318 relative to an initial location within the retail area 302, such as an entrance 320. The locations may be determined according to an (x,y) coordinate system, where the x-coordinate represents a distance (e.g., in meters (m)) to the east or west from the initial location, and the y-coordinate represents a distance (e.g., in meters) to the north or south of the initial location. For example, the entrance 320 may be located at coordinates (0, 0). In another example, a first merchandizing fixture 304 may be rectangular having an upper-left corner at coordinates (3 m, 2 m), an upper-right corner at coordinates (7 m, 2.5 m), a lower-left corner at coordinates (3 m, 1 m), and a lower-right corner at coordinates (7 m, 1.5 m). In other embodiments, the locations may be determined according to any suitable coordinate system using any suitable units of measurement.

The occupancy grid map 300 is merely one example of an occupancy grid map. While each of the merchandizing fixtures is rectangular, the merchandizing fixtures may be circular, square-shaped, cylindrical, or any other suitable shape. Furthermore, the occupancy grid map 300 may also include an overhead view of other objects in addition to the merchandizing fixtures 304-318, such as a check-out counter.

In some embodiments, the autonomous vehicle 12 may obtain the occupancy grid map from the server device 102. For example, the server device 102 may store occupancy grid maps in the database 150, and may transmit an occupancy grid map to the autonomous vehicle 12 for a selected retail location. The autonomous vehicle 12 may provide the selected retail location to the server device 102 or may transmit a current location of the autonomous vehicle 12 and the server device 102 may identify a selected retail location based on the current location of the autonomous vehicle 12.

In other embodiments, the autonomous vehicle 12 may generate the occupancy grid map. For example, the autonomous vehicle 12 may traverse the retail area without having a pre-stored map of the retail area. Using the laser scanning device 16 for example, the autonomous vehicle 12 may identify objects to avoid in the retail area, such as merchandizing fixtures, shopping carts, people, etc. The autonomous vehicle 12 may also determine locations within the retail area using motion sensors and may capture images at the various locations. The captured images may be aggregated according to their respective locations to generate the occupancy grid map. In other embodiments, the autonomous vehicle 12 may generate the occupancy grid map based on data from the laser scanning device 16. For example, the autonomous vehicle 12 may determine proximity to various objects such as merchandizing fixtures using the laser scanning device 16. The autonomous vehicle 12 may identify an object as a merchandizing fixture based on the size of the object (e.g., height, width, etc.), and may determine the locations of the merchandizing fixtures within the retail area based on the motion sensors using odometry techniques, for example.

Based on the occupancy grid map 300, and more specifically the locations of merchandizing fixtures 304-318 within the retail area 302 according to the occupancy grid map 300, the autonomous vehicle 12 may identify several waypoints within the retail area for traversal. In this manner, the autonomous vehicle 12 may capture images of the entire retail area by navigating to each of the waypoints.

Figure 3B:
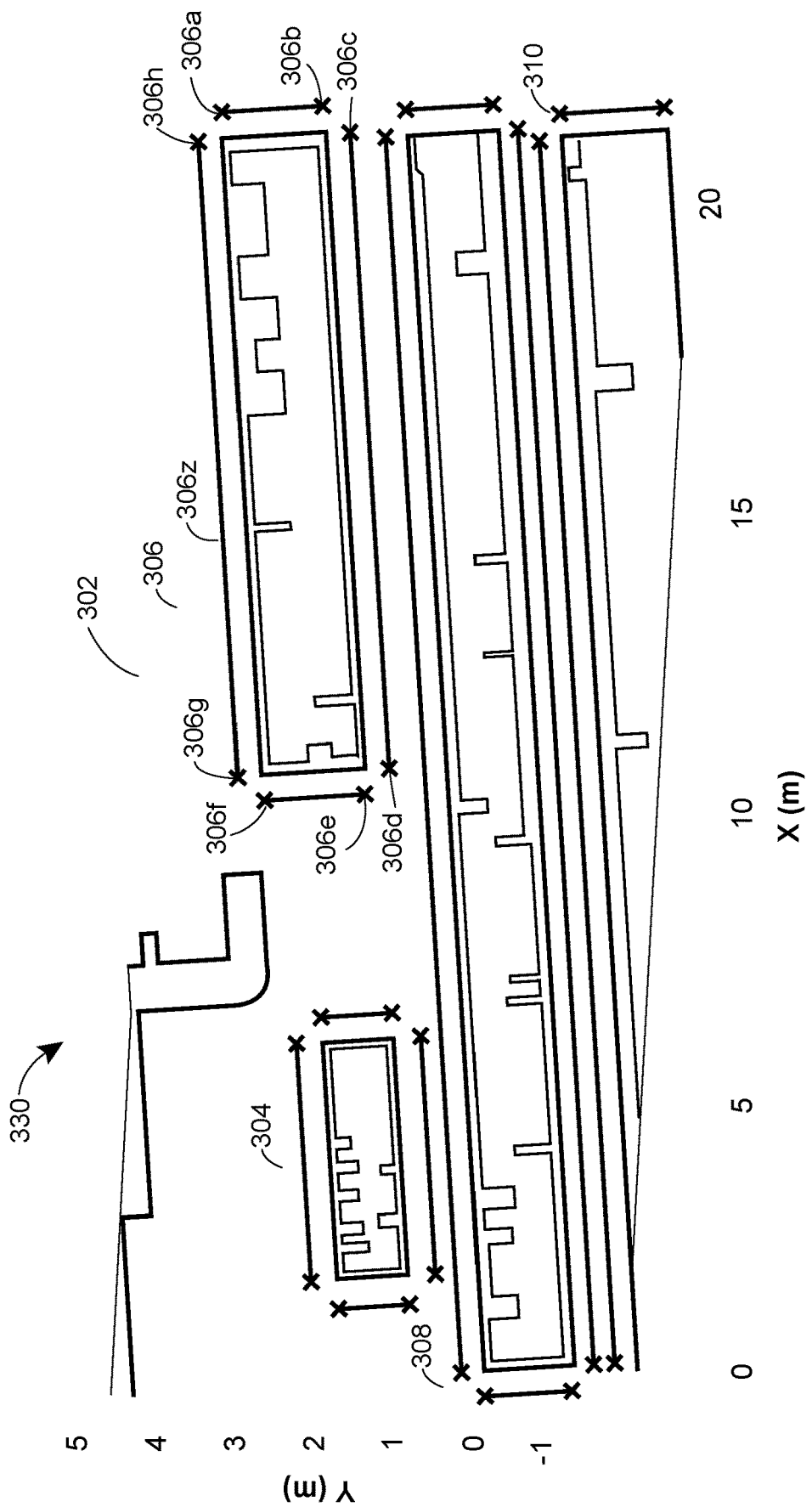
FIG. 3B illustrates another exemplary occupancy grid map annotated with waypoints that may be traversed by the autonomous vehicle.

FIG. 3B illustrates another example occupancy grid map 330 annotated with waypoints that may be traversed by the autonomous vehicle. The occupancy grid map 330 may be a zoomed in version of the occupancy grid map 300 and may depict a portion of the retail area 302. For example, the occupancy grid map 330 may include merchandizing fixtures 304-310 as depicted in the occupancy grid map 300. Additionally, the occupancy grid map 330 may include several waypoints 306a-h, depicted as 'X's, around the perimeter of merchandizing fixture 306. The autonomous vehicle may also assign several waypoints to locations around the perimeters of merchandizing fixtures 304, 308, 310, and/or any other merchandizing fixture within the retail area 302. Each waypoint may correspond to a particular location within the retail area 302, for example as indicated by an (x,y) coordinate pair. More specifically, waypoint 306a for example, may correspond to (x,y) coordinate pair (20 m, 4 m).

To assign waypoints, the movement control application 162 of the autonomous vehicle 12 may identify several locations, such that the autonomous vehicle 12 may traverse the entire retail area by navigating to each of the identified locations. The movement control application 162 may then assign a waypoint to each of the identified locations. In some embodiments, each waypoint may be a threshold distance (e.g., 0.3 meters, 0.6 meters, etc.) from the perimeter of the corresponding merchandizing fixture. For example, waypoint 306a may be 0.6 meters away from the perimeter of merchandizing fixture 306, such that the autonomous vehicle 12 may capture images of the merchandizing fixtures, where each image depicts a threshold size for the merchandizing fixture (e.g., two meters wide by one meter high).

The movement control application 162 may obtain a threshold size for each of the images and may determine the threshold distance away from the perimeter of the merchandizing fixtures based on the threshold size. For example, the threshold size of a merchandizing fixture in an image may be in proportion to the distance between the autonomous vehicle 12 and the merchandizing fixture. In some embodiments, the threshold size for each of the images may include a width that is equal to the length of the merchandizing fixtures to minimize the number of waypoints assigned to the retail area. In other embodiments, the threshold size for each of the images may be determined which minimizes the number of waypoints assigned to the retail area without reducing the image quality. For example, it may be difficult for the server device 102 to identify objects in images having widths which exceed one meter. Accordingly, the threshold size may include a width of one meter for merchandizing fixtures which are at least one meter long. The threshold image size and threshold distance away from the merchandizing fixtures may also be determined in any other suitable manner.

For each merchandizing fixture 304-310 in the occupancy grid map 330, the movement control application 162 may identify a number of waypoints to assign to the merchandizing fixture. While the merchandizing fixtures 304-310 depicted in the occupancy grid map 330 include four sides, the merchandizing fixtures 304-310 may be one-sided, two-sided, or may include any other suitable number of sides. The movement control application 162 may assign one or more waypoints to each side of the merchandizing fixtures 304-310. The waypoints for each side may be spaced apart by a threshold distance based on the size depicted in the captured images and the size of the side of the merchandizing fixture. The movement control application 162 may assign a number of waypoints to each side of a merchandizing fixture to ensure that the captured images depict the entire length of the side.

For example, if a side of a merchandizing fixture is three meters long and the width of the captured images is one meter, the movement control application 162 may assign three waypoints along the perimeter of the three meter long side of the merchandizing fixture, where the waypoints are spaced one meter apart to ensure that the captured images depict the entire length of the side. In another example, if a side of a merchandizing fixture is 1.5 m long and the width of the captured images is one meter, the movement control application 162 may assign two waypoints along the perimeter of the 1.5 m long side of the merchandizing fixture, where the waypoints are spaced at least 0.5 m apart to ensure that the captured images depict the entire length of the side. In yet another example, if a side of a merchandizing fixture is one meter long and the width of the captured images is one meter, the movement control application 162 may assign one waypoint along the perimeter of the one meter long side of the merchandizing fixture, where the waypoint is located at the midpoint of the side to ensure that the captured images depict the entire length of the side.

In some embodiments, the autonomous vehicle 12 may capture multiple images of the side of a merchandizing fixture to capture images which depict the entire height of the side. For example, the autonomous vehicle 12 may capture a first image having a height of one meter and starting from the ground. The autonomous vehicle 12 may then tilt the one or more cameras 14 upward and capture a second image having a height of one meter and starting at one meter above the ground, so that the autonomous vehicle 12 captures images of a merchandizing fixture having a height of two meters. In other embodiments, the autonomous vehicle 12 may capture images at a waypoint without tilting the camera.

In any event, after assigning waypoints to each side of each merchandizing fixture in the retail area 302, the movement control application 162 may determine an optimal path for navigating to each of the waypoints in the retail area 302 according to the shortest total distance and/or time. For example, the optimal path may be determined using graph theory. In some embodiments, the retail area 302 may be represented as a graph where each waypoint corresponds to a vertex in the graph and the path between two waypoints corresponds to an edge of the graph. For example, the path between waypoint 306g and waypoint 306h may be represented by edge 306z. Each edge may have an associated cost corresponding to the distance between the two waypoints connected by the edge (e.g., the distance between waypoint 306g and 306h).

In some embodiments, the retail area 302 may be represented as a directed graph when for example, each the one or more cameras 14 on the autonomous vehicle 12 have the same orientation relative to the autonomous vehicle 12. For example, when each of the one or more cameras 14 capture images to the right of autonomous vehicle 12, the autonomous vehicle 12 travels clockwise for the merchandizing fixtures to be on the right side of the autonomous vehicle 12. The distance from a first waypoint to a second waypoint may be different than the distance from the second waypoint to the first waypoint, because the autonomous vehicle 12 may travel in the same direction in both instances. In other embodiments, the retail area 302 may be represented as an undirected graph, for example when the one or more cameras 14 have different orientations relative to the autonomous vehicle 12, and/or the autonomous vehicle 12 travels in reverse.

In any event, to calculate the optimal path for navigating to each of the waypoints in the retail area 302, the movement control application 162 may identify a permutation of waypoints which includes all of the waypoints in the retail area 302. The identified permutation of waypoints may have a least cost traversal compared to the costs for all other permutations of waypoints. This may be referred to as a travelling salesman problem (TSP), and when the retail area 302 is represented as an undirected graph (e.g., the cost associated with the path from waypoint A to waypoint B is different from the cost associated with the path from waypoint A to waypoint B), the problem may be referred to as an asymmetric travelling salesman problem (ATSP).

More specifically, the movement control application 162 may determine a total cost associated with navigating to each of the waypoints in the retail area 302 in a particular order. The total cost may be determined by aggregating the costs associated with each path between waypoints. For example, to determine the total cost associated with navigating to each of the waypoints surrounding merchandizing fixture 306, the movement control application 162 may identify every possible permutation for navigating to each of the waypoints 306a-h. These permutations may include navigating from waypoint 306a to 306b to 306c to 306d to 306e to 306f to 306g to 306h; navigating from waypoint 306a to 306h to 306d to 306e to 306g to 306b to 306f to 306c; navigating from waypoint 306c to 306d to 306a to 306g to 306f to 306e to 306b to 306h, etc.

For each permutation, the movement control application 162 may aggregate the costs associated with each path between two consecutive waypoints in the permutation. For example, if the permutation includes a path from waypoint 306g to waypoint 306h, the movement control application 162 aggregates the cost associated with edge 306z (e.g., 10 m) with the costs associated with the other edges in the permutation. Accordingly, the total cost for the permutation including waypoint 306a to 306b to 306c to 306d to 306e to 306f to 306g to 306h may be determined by aggregating the costs associated with the paths from 306a to 306b, from 306b to 306c, from 306c to 306d, from 306e to 306f, from 306f to 306g, and from 306g to 306h (e.g., 306z). The total cost associated with a permutation of waypoints may be compared to every other total cost associated with every other possible permutation of the waypoints. In some embodiments, the permutation having the lowest total cost may be the optimal path for navigating to each of the waypoints in the retail area 302.

The autonomous vehicle 12 may then traverse the retail area 302 according to the optimal path (e.g., the permutation of waypoints having the lowest total cost). While the cost associated with a path between a pair of waypoints may be the distance between the waypoints, as mentioned above, the cost may also be a length of time it takes for the autonomous vehicle 12 to traverse between the pair of waypoints. In this scenario, the movement control application 162 may identify an optimal path for navigating to each of the waypoints in the retail area 302 based on a permutation of waypoints associated with the shortest amount of time for traversal rather than the shortest distance.

In some embodiments, the optimal path for navigating to each of the waypoints in the retail area 302 may be determined using a Concorde TSP solver. To use the Concorde TSP solver, an ATSP may be converted to a symmetric traveling salesman problem (STSP) by doubling the size of a matrix representing the costs associated with each of the paths. For example, the costs associated with all paths involving waypoints 306a, 306b, and 306c may be illustrated in Table 1:

TABLE 1

| Asymmetric path weights | | | |
| --- | --- | --- | --- |
| | 306a | 306b | 306c |
| 306a | | 5 m | 10 m |
| 306b | 1 m | | 7 m |
| 306c | 3 m | 12 m | |

The 3×3 matrix may then be doubled resulting in a 6×6 matrix to convert the ATSP to a TSP problem. Each of waypoints may be duplicated so that waypoint 306a may have a corresponding waypoints 306a' for example, and the costs associated with paths between duplicate waypoints (e.g., 306a to 306a') may be zero, such that there is no cost associated with moving between two of the same waypoint. For example, the costs associated with all paths involving waypoints 306a, 306b, and 306c in a symmetric TSP may be illustrated in Table 2:

TABLE 2

| Symmetric path weights | | | | | | |
|---|---|---|---|---|---|---|
| | 306a | 306b | 306c | 306a' | 306b' | 306c' |
| 306a | | | | 0 | 1 m | 3 m |
| 306b | | | | 5 m | 0 | 12 m |
| 306c | | | | 10 m | 7 m | 0 |
| 306a' | 0 | 5 m | 10 m | | | |
| 306b' | 1 m | 0 | 7 m | | | |
| 306c' | 3 m | 12 m | 0 | | | |

The converted STSP may then be solved using the Concorde TSP solver. In other embodiments, the ATSP may be solved in any suitable manner, including comparing the total costs associated with every possible permutation of waypoints in the retail area 302 and determining the permutation of waypoints having the least total cost, as mentioned above. The ATSP may also be solved using dynamic programming methods such as the Held-Karp algorithm, linear programming methods, heuristic and approximation algorithms, etc.

When the movement control application 162 identifies the optimal path for traversing the retail area 302, the movement control application 162 may transmit control signals to the movement control system 156 causing the autonomous vehicle 12 to navigate to the first waypoint on the path. For example, the control signals may specify a distance and/or direction of travel. After reaching each waypoint, as determined based on the distance and direction traveled, the movement control application 162 may transmit control signals to the movement control system 156 causing the autonomous vehicle 12 to navigate to the next waypoint on the path until all of the waypoints have been reached. For example, the control signals may specify distances and directions of travel for each of the waypoints. Additionally, the store imaging application 164 may capture images of one of the merchandizing fixtures in the retail area 302 via the cameras and/or depth sensors included in the sensor system 152 at each of the waypoints.

As the autonomous vehicle 12 navigates along the optimal path for traversing the retail area 302, the movement control application 162 may detect obstacles along the path via the laser scanning device 16. The obstacles may be shopping carts, retail products which fell from the merchandizing fixtures, people, etc. The movement control application 162 may then transmit control signals to the movement control system 156 causing the autonomous vehicle 12 to avoid an obstacle without substantially deviating from the optimal path. For example, the autonomous vehicle 12 may deviate from the optimal path to avoid the obstacle and once the obstacle has been avoided, the autonomous vehicle 12 may continue to navigate along the optimal path. This is further illustrated in FIG. 3C.

Figure 3C:
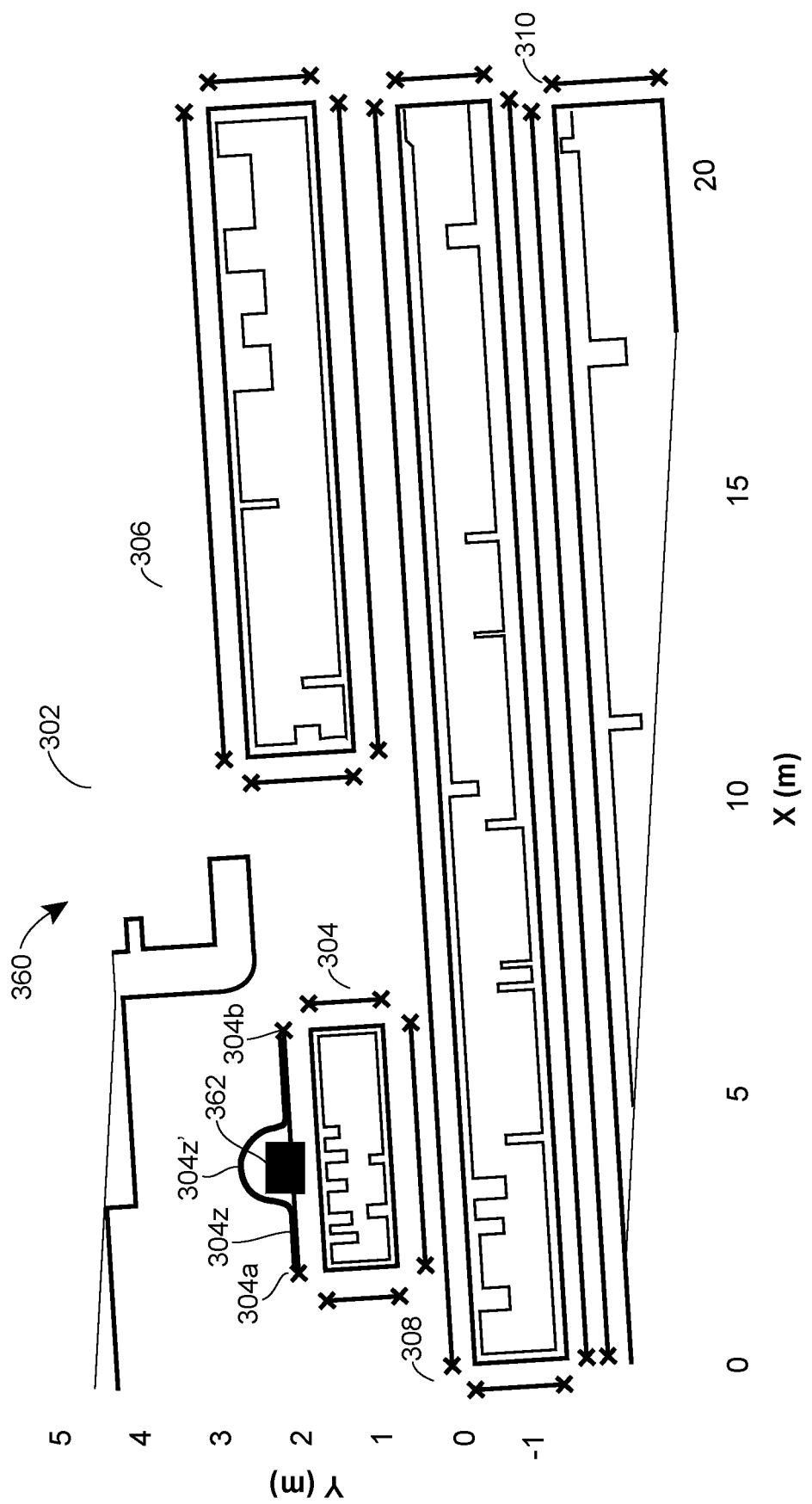
FIG. 3C illustrates yet another exemplary occupancy grid map annotated with an exemplary path for the autonomous vehicle to traverse and including an obstruction.

FIG. 3C illustrates another occupancy grid map 360 similar to the occupancy grid map 330 as shown in FIG. 3B and depicting a portion of the retail area 302. As in FIG. 3B, the occupancy grid map 360 includes merchandizing fixtures 304-310. Additionally, the occupancy grid map 360 may include waypoints 304a-b, depicted as 'X's, around the perimeter of merchandizing fixture 304. The path 304z between the waypoints 304a-b may be a straight line from waypoint 304a to waypoint 304b. However, as the autonomous vehicle 12 traverses along this path 304z, the movement control application 162 may detect the presence of an obstacle via the laser scanning device 16, such as a box 362. To avoid the box 362, the movement control application 162 may determine the size of the box 362 via the laser scanning device 16. The movement control application 162 may then identify an adjusted path 304z' for avoiding the box 362 without deviating too far from the original path 304z. For example, the movement control application 162 may determine a minimum distance away from the original path 304z to traverse while avoiding the box 362.

As a result, the autonomous vehicle 12 may traverse along the adjusted path 304z' until the autonomous vehicle 12 has successfully maneuvered around the box 362 and there are no other obstacles along the original path 304z as detected via the laser scanning device 16. The movement control application 162 may then cause the autonomous vehicle 12 to maneuver back onto the original path 304z which may be followed until the autonomous vehicle 12 reaches waypoint 304b. In this manner, the movement control application 162 may cause the autonomous vehicle 12 to navigate along the optimal path for traversing the retail area 302 while detecting obstacles during traversal. The movement control application 162 may then adjust the path to avoid obstacles, where the adjusted path may add a minimum amount of distance necessary for avoiding the obstacles to the distance for the original path.

Map Generation for Automatically Mapping Store Layouts

As mentioned above, the autonomous vehicle 12 may capture images of the merchandizing fixtures at each of the waypoints in the retail area 302. The store imaging application 164 may transmit each of these images to the server device 102 as the images are captured or after the retail area 302 has been traversed. The store imaging application 164 may also transmit the location of each captured image, the size of the area depicted in the captured image (e.g., a height and width), and depth information for the captured image. For example, the store imaging application 164 may transmit 3D image data represented as RGB-D sensor data to the server device 102.

The server device 102 may then analyze the 3D images of the merchandizing fixtures to identify the retail products on the merchandizing fixtures and their respective locations within the retail area. In other embodiments, the autonomous vehicle 12 and more specifically, the store imaging application 164 may perform the 3D image analysis to identify the retail products. Moreover, in some embodiments, the server device 102 may stitch the 3D images of the merchandizing fixtures together according to the locations of the 3D images before performing the image analysis. For example, there may be several 3D images depicting portions, sides, sections, etc. of the merchandizing fixture 304 as shown in FIG. 3C.

The server device 102 may stitch together each of these 3D images to create a composite 3D image depicting the entire merchandizing fixture 304. In other embodiments, the server device 102 may analyze each of the 3D images individually to identify retail products and their respective locations, or may stitch together any suitable number of the 3D images to perform the analysis. In another example, the server device 102 may determine a number of 3D images to stitch together based on the size of the area depicted in the captured images. The server device 102 may obtain a threshold image size for performing the analysis and when the size of the area depicted in the captured images is less than the threshold image size, the server device 102 may stitch 3D images together to create a composite 3D image which meets the threshold image size. For example, if the threshold image size includes a width of two meters and a height of one meter, and the area depicted in the 3D images includes a width of one meter and a height of one meter, the server device 102 may stitch two images at adjacent locations together to create a composite 3D image which meets the threshold image size requirements.

In any event, the server device 102 and more specifically, the map building application 146 may analyze the 3D images or composite 3D images to identify objects depicted within the images. This process is described in more detail below. The map building application 146 may identify visual descriptors and semantic cues for each of the objects which may be used to identify a retail product that corresponds to the object, also described in more detail below. Furthermore, retail areas are typically organized by retail department, such as a cold medicine department, a vitamins department, a first aid department, a cosmetics department, a skin care department, a cereal department, a soda department, an electronic department, or any other suitable department referring to a category of retail products. In some scenarios, each merchandising fixture may correspond to a different retail department. In other scenarios, portions of merchandising fixtures may correspond to different retail departments.

Figure 4:
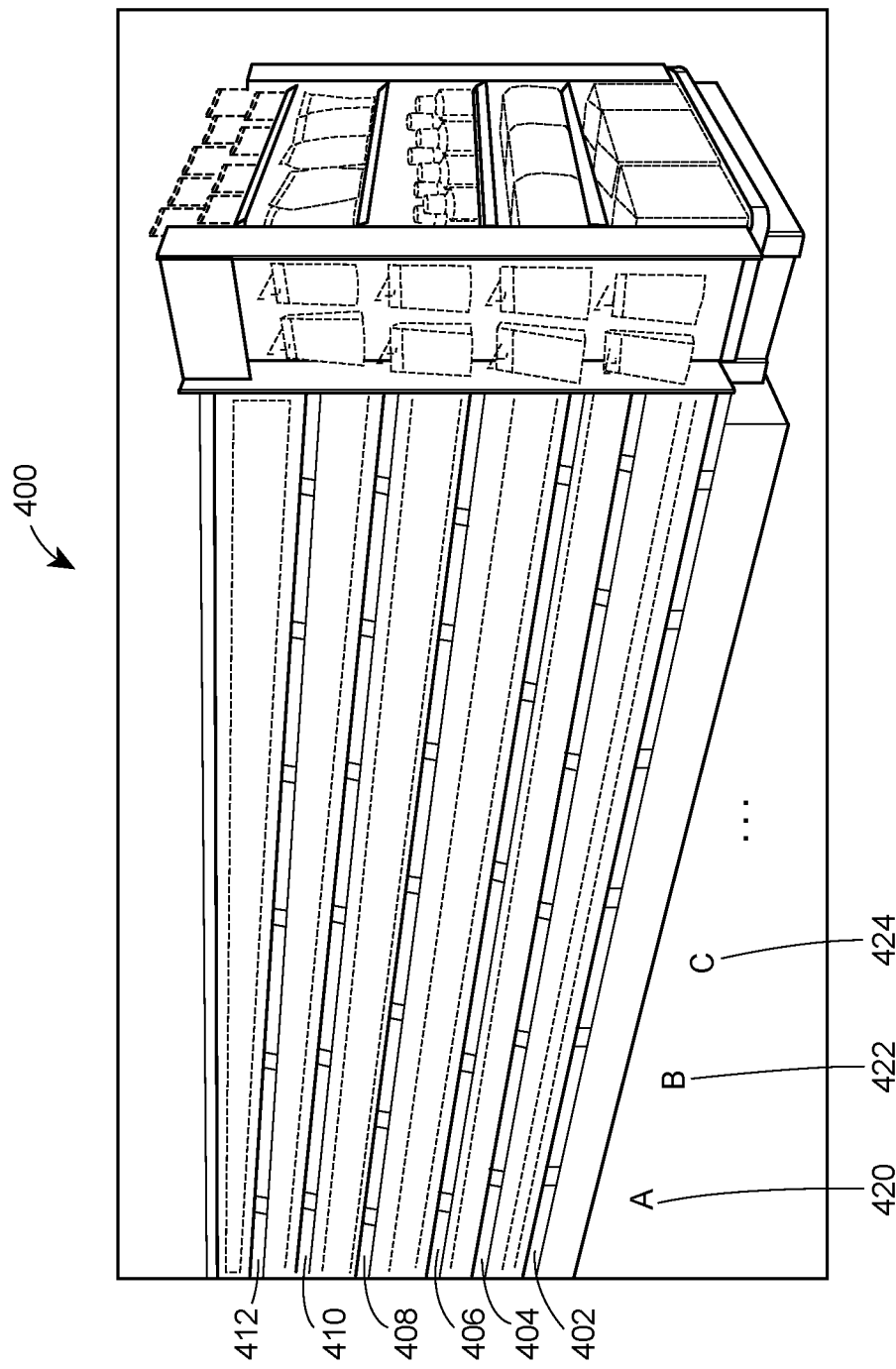
FIG. 4 illustrates an exemplary merchandizing fixture arrangement.

FIG. 4 illustrates an example merchandising fixture 400 which may appear in a retail area and may be organized by retail department. In this example, the merchandising fixture 400 is a shelving unit having several shelves 402-412. The merchandising fixture 400 may be divided into several areas lengthwise including area A (reference no. 420), area B (reference no. 422), area C (reference no. 424), etc. Each area may correspond to a particular retail department. For example, area A (reference no. 420) may correspond to a cold medicine department, area B (reference no. 422) may correspond to a vitamins department, and area C (reference no 424) may correspond to a first aid department. Accordingly, each of the retail products in area A (reference no. 420) of the merchandising fixture 400 may be various cold medicines. The merchandising fixture 400 may be arranged vertically, such that each of the retail products within a particular section of the merchandising fixture (e.g., area A) belongs to the same retail department. In other embodiments, the merchandising fixture 400 may be arranged horizontally or in any other suitable manner.

Based on this arrangement, when the map building application 146 identifies a retail product that corresponds to an object in a 3D image, the map building application 146 may compare the retail department associated with the retail product to retail departments associated with retail products neighboring the object. If the retail departments associated with retail products neighboring the object are different than the retail department associated with the retail department corresponding to the object, the map building application 146 may identify a different retail product that corresponds to the object and is associated with the retail department matching the retail departments for neighboring objects. For example, for an object located in area A (reference no. 420), the map building application 146 may retrieve retail departments for retail products corresponding to other objects within area A (reference no. 420). If the other objects in area A are associated with cold medicine products and the map building application 146 identifies the object as corresponding to a type of lipstick, the map building application 146 may identify a different retail product associated with cold medicine. This is described in more detail below.

Retail departments may be identified in several ways. In one embodiment, the map building application 146 may identify barcodes or other tags in the 3D images of the merchandising fixtures. For example, the barcodes or other tags may be semantic cues displayed on objects or may be displayed on the merchandising fixtures. In any event, the map building application 146 may analyze and decode a barcode to determine a product identifier associated with the barcode, such as a Universal Product Code (UPC). The product identifier may be used to retrieve information about the retail product from a product identifier database. This information may include a retail department associated with the retail product. Accordingly, for a merchandising fixture or a portion of a merchandising fixture (e.g., area A), the map building application 146 may identify barcodes within the area and decode the barcodes to retrieve retail departments for the objects in the area. When more than a threshold amount of the objects correspond to the same retail department, the map building application 146 may determine that the area, such as area A corresponds to the retail department.

In other embodiments, the map building application 146 may identify objects within a 3D image and determine retail products which correspond to the objects, as described in more detail below. For each object, the map building application 146 may determine an associated retail department for the object based on the retail departments associated with the object's neighbors. Retail departments associated with neighbors that are closer to the object may be weighted more heavily than retail departments associated with neighbors farther from the object. In yet other embodiments, the map building application 146 may determine retail departments associated with the objects based on a combination of the tags and the retail departments associated with an object's neighbors. For example, the map building application 146 may analyze and decode tags to determine a retail department for an estimated area within a merchandising fixture. The map building application 146 may then adjust the estimated area based on retail departments associated with objects within the area. Accordingly, the area may expand, decrease or shift based on the adjustment.

Figure 5:
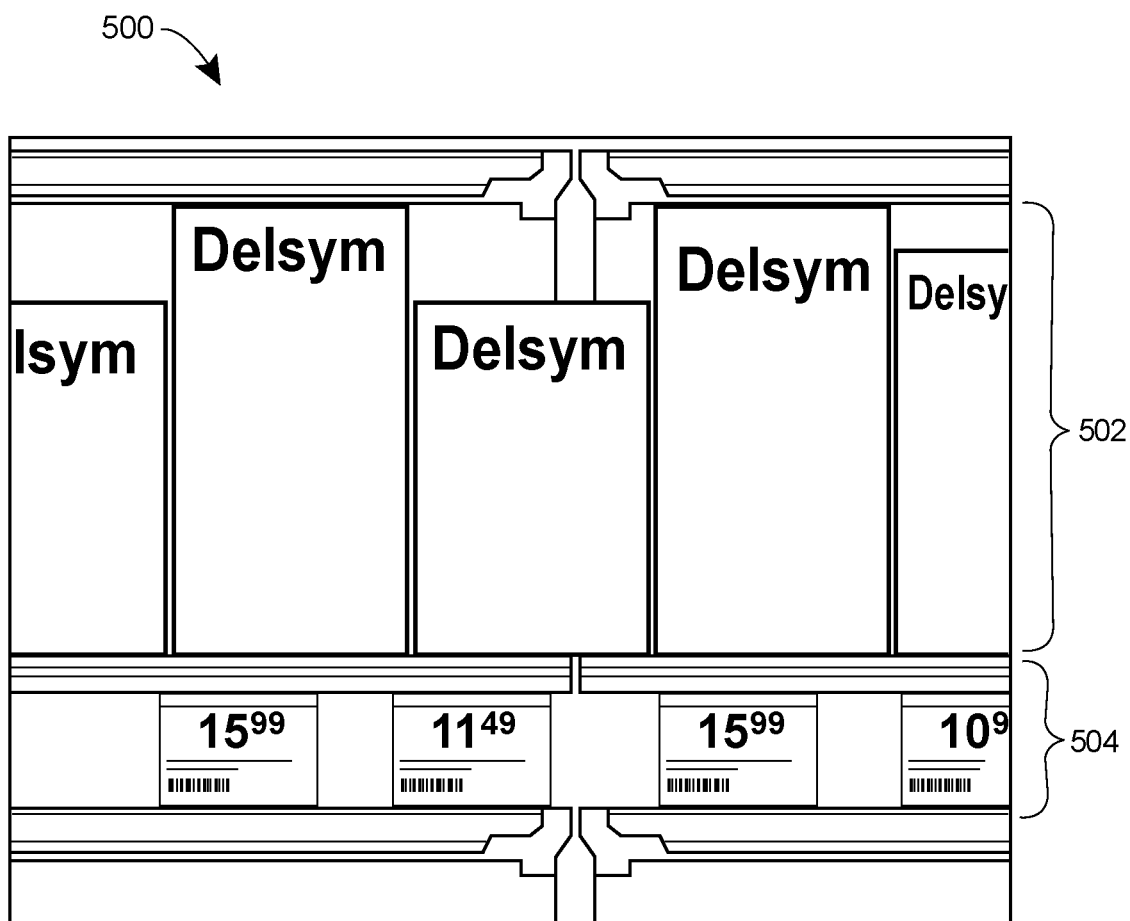
FIG. 5 illustrates an exemplary portion of a merchandizing fixture which may be included in the exemplary merchandizing fixture arrangement illustrated in FIG. 4.

FIG. 5 illustrates an example image captured by the autonomous vehicle 12 depicting a portion 500 of a merchandising fixture, such as the merchandising fixture 400 as shown in FIG. 4. The portion 500 may include several objects 502 corresponding to retail products and several tags 504 fixedly attached to the merchandising fixture housing the retail products. In some embodiments, the tags 504 may be located on the several objects 502. The tags 504 may be linear barcodes such as a UPC code, Radio Frequency Identification (RFID) tags, QR codes, 2D barcodes, etc. As mentioned above, to determine a retail department associated with the portion 500 of the merchandising fixture, the map building application 146 may analyze and decode the tags 504.

Figure 6:
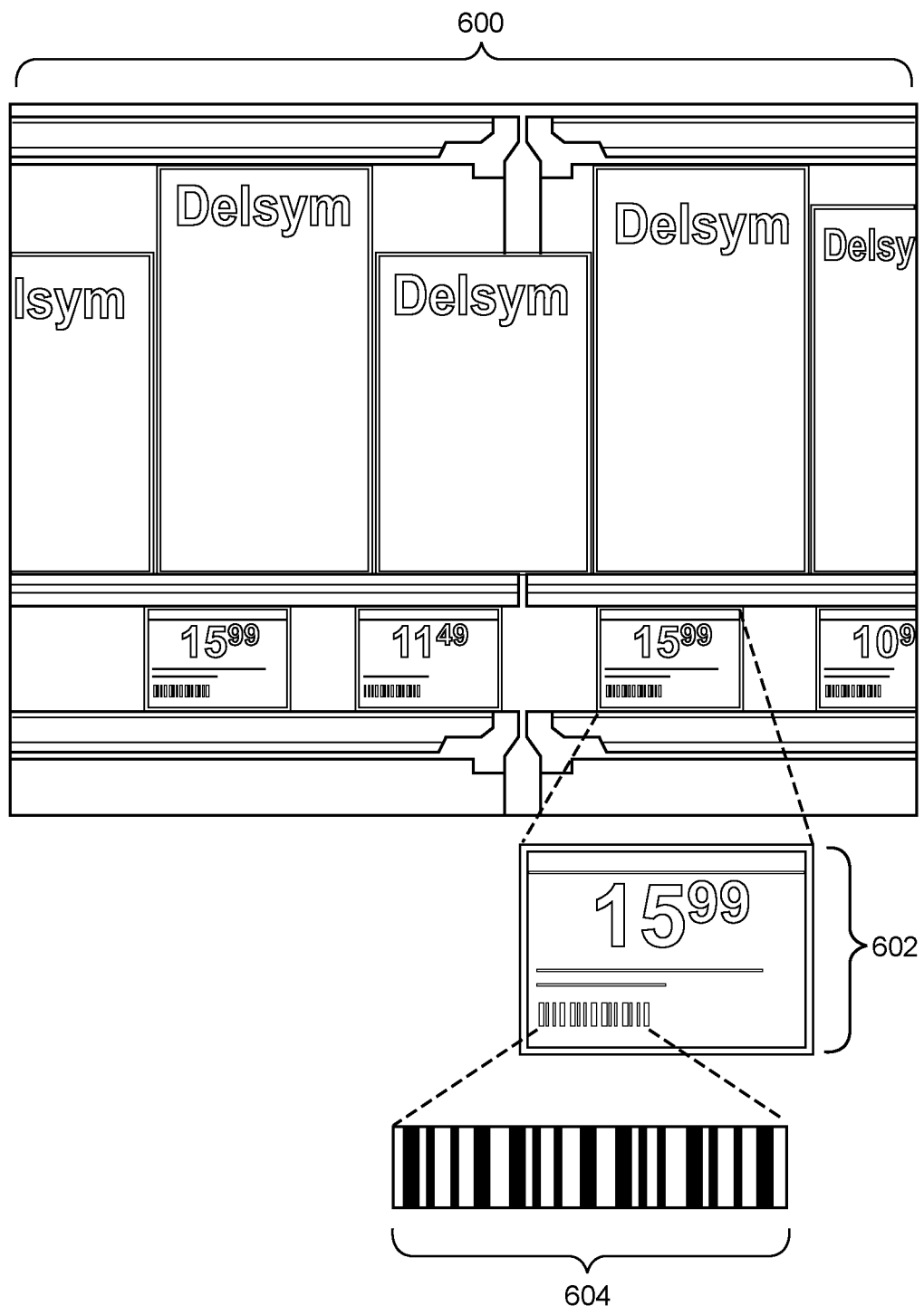
FIG. 6 illustrates exemplary image processing of several objects in the image depicted in FIG. 5.

FIG. 6 illustrates an example image analysis of an image 600 similar to the image depicted in FIG. 5. The map building application 146 may filter out color in the image 600 converting the image to grayscale. Then the map building application 146 may identify tags within the image, such as tag 602. The tag 602 may include a barcode 604 which may be scanned by the one or more cameras 14 in the autonomous vehicle 12 or one or more cameras coupled to the server device 102. In any event, the barcode 604 may be scanned to identify a particular pattern, such as a pattern of black and white lines, a pattern of black and white pixels, etc. The map building application 146 may decode the pattern converting the pattern in the barcode 604 to a text string or other data steam.

The decoded text string may be a product identifier which can be used to retrieve information about the product, such as the associated retail department. For example, the product identifier for the barcode 604 may be used to identify the area depicted in the image 600 as part of a cold medicine department. In some embodiments, the map building application 146 may retrieve retail departments associated with product identifiers for each of the tags in the image and identify the retail department for the area depicted in the image 600 based on all of the retrieved retail departments. For example, the area depicted in the image 600 may include one or several retail departments. Furthermore, the retail department for the area may also be determined based on the most frequently occurring retail department for the product identifiers in the area.

Additionally, in some embodiments, boundaries for each retail department may be determined based on the product identifiers. For example, if a tag associated with the cold medicine department is immediately to the right of two adjacent tags associated with the first aid department, the map building application 146 may determine that the boundary for the first aid department occurs at the intersection between the tag associated with the cold medicine department and the tag associated with the first aid department. On the other hand, if a tag associated with the cold medicine department is located in between two tags associated with the first aid department, the map building application 146 may determine that a product is misplaced or the tag has been identified incorrectly.

While the example image analysis identifies, scans, and decodes a tag 602 in the image 600, the image analysis may also be performed to identify objects in the image, identify visual descriptors and semantic cues for the objects, and/or determine retail products corresponding to the objects, as described in more detail below.

As mentioned above, in addition to identifying retail departments depicted in the images, the server device 102 and more specifically, the map building application 146 may identify objects within each image and determine retail products which correspond to the objects based on visual descriptors and semantic cues for the objects. To identify objects within a 3D image, the map building application 146 may segment boundaries for the objects using edge detection, pixel entropy, or other image processing techniques, as described in more detail below with reference to FIG. 7. For each identified object, the map building application 146 may identify visual descriptors within the object along with the corresponding locations of the visual descriptors within the object. For example, a first visual descriptor may be located in the upper right corner of the object, a second visual descriptor may be located in the center of the object, etc.

A visual descriptor may include a keypoint which is a stable region within the object that is detectable regardless of blur, motion, distortion, orientation, illumination, scaling, and/or other changes in camera perspective. The stable regions may be extracted from the object using a scale-invariant feature transform (SIFT), speeded up robust features (SURF), fast retina keypoint (FREAK), binary robust invariant scalable keypoints (BRISK), or any other suitable computer vision techniques. In some embodiments, keypoints may be located at high-contrast regions of the object, such as edges within the object. A bounding box may be formed around a keypoint and the portion of the object created by the bounding box may be a visual descriptor. In some embodiments, each visual descriptor is encoded as a vector which may include attributes of the visual descriptor, such as RGB pixel values, the location of the visual descriptor within the object, etc. Additionally, for each identified object, the map building application 146 may identify semantic cues for the object, as described in more detail below with reference to FIG. 8.

Figure 7:
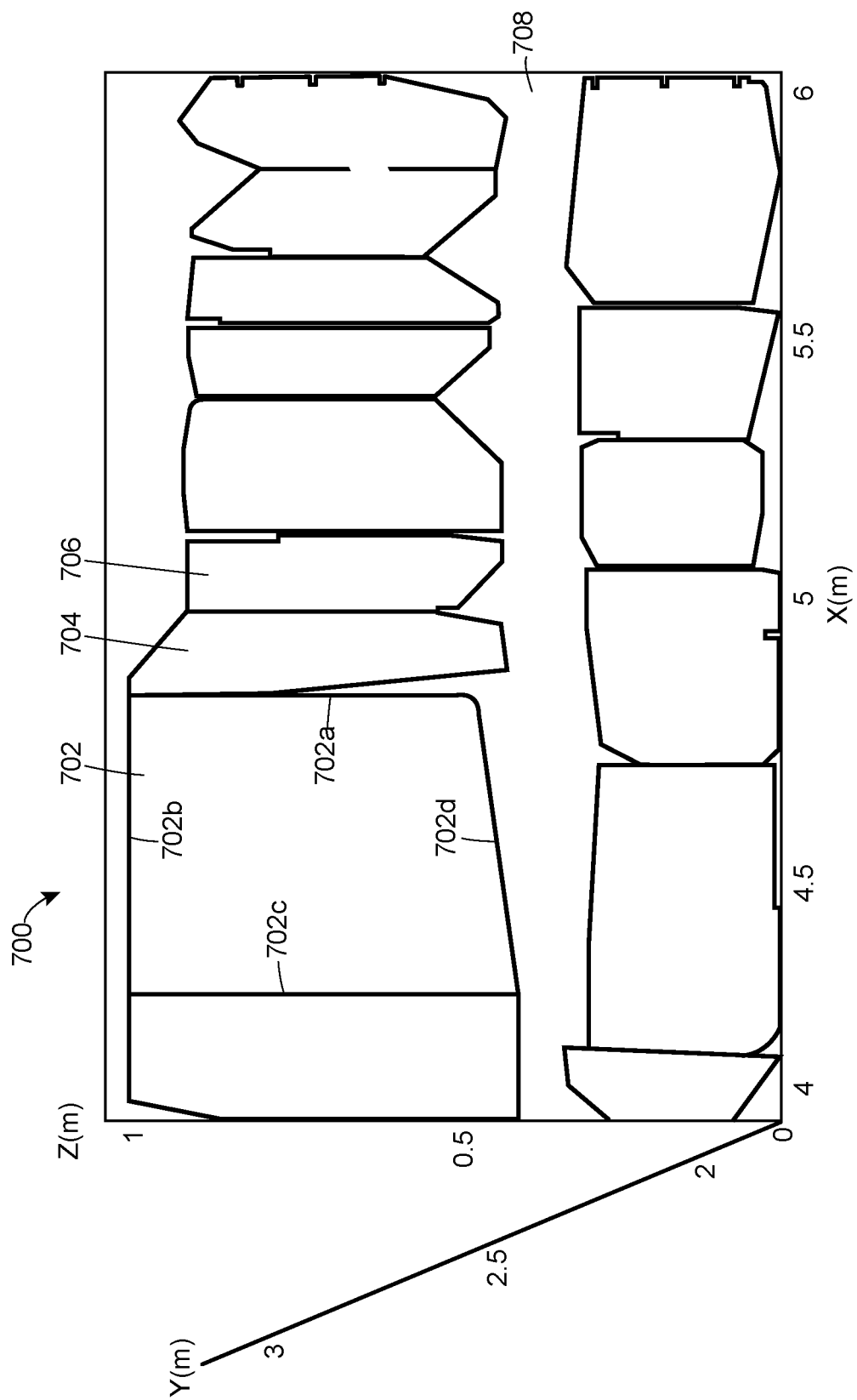
FIG. 7 illustrates exemplary boundary segmentation of an image depicting a merchandizing fixture.

Turning now to FIG. 7, an example image 700 depicts a merchandizing fixture after boundary segmentation has been applied to the image 700. To perform the boundary segmentation, the map building application 146 may filter out the merchandizing fixture from the image 700. For example, based on the RGB-D sensor data for the image 700, the map building application 146 may identify the amount of depth for various portions within the image 700. When various objects are placed on a merchandizing fixture, the objects are further away from the one or more cameras 14 than the merchandizing fixture. Therefore, the merchandizing fixture may have the least amount of depth in the image 700, and the map building application 146 may filter the portion of the image 700 having the least amount of depth or having less than a predetermined threshold depth to filter out the merchandizing fixture. Reference no. 708 may depict the portion of the image 700 which previously included the merchandizing fixture.

In some embodiments, the map building application 146 may also filter color from the image 700 converting it to grayscale to further accentuate the boundaries of objects in the image 700. The map building application 146 may then perform edge detection techniques to segment boundaries for the objects. For example, when adjacent pixels in the image 700 differ in intensity by more than a threshold amount, the map building application 146 may identify the intersection between the adjacent pixels as a boundary of an object. In another example, when a cluster of pixels in the image 700 differs in intensity by more than a threshold amount from an adjacent cluster of pixels, the map building application 146 may identify the intersection between the adjacent pixels as a boundary of an object. For example, the boundary segmentation may identify objects 702, 704, 706, etc., where object 702 has boundaries 702a, 702b, 702c, and 702d. While the boundaries for object 702 appear to be two-dimensional, the boundaries for object 704 appear to be three-dimensional, where some portions of the object appear closer to the camera view than other portions of the object. In addition to performing the edge detection techniques described above to identify the boundaries of an object, the map building application 146 may use an active contour model to refine the locations of the boundaries and further remove noise.

Based on the boundary segmentation, the map building application 146 may identify each of the objects in the image 700. For each identified object, the map building application 146 may determine a size and shape of the object according to its boundaries. For example, the map building application 146 may determine that object 702 is rectangular. Several keypoints may be identified within each identified object along with corresponding visual descriptors in the manner described above.

Also, as mentioned above, the store imaging application 164 in the autonomous vehicle 12 may transmit the location of each captured image, the size of the area depicted in the captured image (e.g., a height and width), and depth information for the captured image. Accordingly, the map building application 146 may determine the locations of each of the objects within the image 700 by for example, determining a physical location corresponding to each pixel in the image 700 based on the data transmitted by the store imaging application 164. Using the depth information in addition to the size and location information, the map building application 146 may determine physical locations represented as (x,y,z) coordinates for each pixel in the image 700. The x-coordinate may represent a distance (e.g., in meters) to the east or west from an initial location such at the entrance of the retail area, the y-coordinate may represent a distance (e.g., in meters) to the north or south of the initial location, and the z-coordinate may represent a vertical distance (e.g., in meters) from the ground. For example, one corner of the image 700 is located at coordinates (4 m, 2 m, 0 m).

The map building application 146 may use the physical locations for each pixel in the image to determine the size of the objects. For example, object 702 may be about 0.5 m wide and 0.6 m tall. The shape and size of an object may be compared to templates of retail products to determine likelihoods that the object corresponds to the retail products in the templates. The map building application 146 may also use the physical locations for each pixel in the image to determine the physical locations for the visual descriptors. The visual descriptors and their corresponding locations within an object may be compared to visual descriptors and their corresponding locations in the templates of retail products. Based on the amount of similarity between the visual descriptors in the object and the visual descriptors in a template, the map building application 146 may determine a likelihood or confidence value that the object corresponds to the retail product in the template.

Template Library

To generate the templates, the map building application 146 may obtain images of each retail product within a store or a collection of stores. In some embodiments, the map building application 146 may obtain several images for a retail product, for example one image for every side or face of the retail product (e.g., a rectangular product may have six sides and the map building application 146 may obtain an image captured from each of the six sides). For each retail product, the map building application 146 may extract visual descriptors and semantic cues along with their corresponding locations within each side or face of the retail product. Each of the visual descriptors and semantic cues along with their corresponding locations for a retail product may be stored together, for example in the database 150 as a template for the retail product. The database 150 may include a template library of these templates of retail products for comparison to an object.

For example, the width and height of a side or face of a retail product may be included in the template for the retail product. Additionally, semantic cues such as text, tags, or a symbol displayed on one of the sides or faces may be included in the template for the retail product. Furthermore, visual descriptors which include keypoints within the images of the retail product and their corresponding locations relative to the retail product (including a side or face of the retail product in which the visual descriptors are located) may also be included in the template.

The visual descriptors for a retail product may be identified in a similar manner as the visual descriptors for the object, as described above. For example, the keypoints may be identified by extracting stable regions of an image which are detectable regardless of blur, motion, distortion, orientation, illumination, scaling and/or other changes in camera perspective. The stable regions may be extracted using SIFT, SURF, FREAK, BRISK, or any other suitable computer vision techniques. A bounding box may be formed around a keypoint and the portion of the image created by the bounding box may be a visual descriptor. In some embodiments, each visual descriptor is encoded in the template of the retail product as a vector. The vector may include attributes of the visual descriptor, such as RGB pixel values, the location of the visual descriptor within the image, etc. Additionally, the semantic cues for a retail product may be identified in a similar manner as the semantic cues for the object, as described in more detail below. In this manner, visual descriptors and semantic cues identified for an object may be compared to the visual descriptors and semantic cues included within the template of the retail product to determine a likelihood that the object corresponds to the retail product.

In addition to generating the template and identifying visual descriptors for each object, the map building application 146 may identify semantic cues within each object. For example, for object 702 the map building application 146 may identify text characters which occur within boundaries 702a-d, may identify a symbol within boundaries 702a-d, may identify a tag within boundaries 702a-d, etc. Each of these semantic cues for the object may also be compared to the templates of retail products to determine likelihoods that the object corresponds to each of the retail products in the templates.

To identify text with an object, the map building application 146 may apply a stroke width transform (SWT). The SWT is used to find a portion of an image, such as the image 700, which includes text and filter out the remaining portions of the image which do not include text. In this manner, the text portion of the image may be converted to a text string. The SWT technique may be based on an assumption that all text characters in an image have the same stroke width. For example, when the letter 'T' is placed within an image, the pixel width of the horizontal line in the letter 'T' may be the same as the pixel width for the vertical line in the letter 'T' within the image. This width may also be the same for all other lines or curves that make up text characters within the image.

Based on this assumption, the map building application 146 may identify text characters within an image by identifying several lines or curves having a same or similar width (e.g., within a threshold variance of each other). More specifically, the map building application 146 may perform edge detection techniques within one of the objects, such as the edge detection techniques described above for boundary segmentation, to identify boundaries for lines and curves within the object. The map building application 146 may then calculate pixel widths for each of these lines and curves based on the positions of their respective boundaries. When the pixel widths for several lines and/or curves are the same or are within a threshold variance of each other, the map building application 146 may identify the lines and/or curves as text, and may filter out the remaining portions of the object.

Additional filtering steps may also be applied to identify the text characters within the image. For example, text characters may have minimum and maximum aspect ratios, such that the length of a text character does not exceed the width of the text character by more than a threshold amount. Accordingly, the identified lines and/or curves may be compared to minimum and maximum aspect ratios. If the length to width ratio of a candidate text character is outside the minimum or maximum aspect ratios, the candidate text character may be filtered out as a portion of the image which does not include text.

A threshold ratio between the diameter of a text character and the text character's average stroke width may also be used to filter out portions of the image which do not include text. For example, if the map building application 146 identifies a portion of an image which resembles the letter '0' the map building application 146 may calculate the ratio of the diameter for the candidate text character to the average stroke width. When the ratio is less than the threshold ratio by more than a threshold variance (e.g., the candidate text character is donut-shaped) or the ratio is more than the threshold ratio by more than the threshold variance, the candidate text character may be filtered out as a portion of the image which does not include text. Moreover, the map building application 146 may filter out candidate text characters having less than a minimum threshold size or greater than a maximum threshold size (e.g., a minimum height of 8 pixels and a maximum height of 300 pixels). In some embodiments, other filtering steps may also be applied such as filtering overlapping bounding boxes, or any other suitable filtering steps.

In addition to identifying text characters, the map building application 146 may also use the SWT to identify words. For example, all text characters in a word may have the same color, may be spaced apart evenly, may be within a threshold distance from each other, and may be the same height or have height differences which are less than a threshold amount. Accordingly, the map building application 146 may identify words by grouping identified text characters having the same color, that are within a threshold height difference of each other, that are within a threshold distance of each other, and/or that are spaced apart by the same distance.

In some embodiments, the map building application 146 may use Maximally Stable Extremal Regions (MSER) techniques to identify text within an object or may use a combination of SWT and MSER to identify the text. Once text is identified within an object, the portion of the object containing text may be provided to an optical character recognition (OCR) engine which may convert an image (e.g., the portion of the object containing text) to a text string. For example, if the map building application 146 identifies a portion of object 702 which contains text, the map building application 146 may extract the portion of object 702 from the image depicting a merchandizing fixture, and the extracted image containing text may be converted to a text string via the OCR engine.

Figure 8:
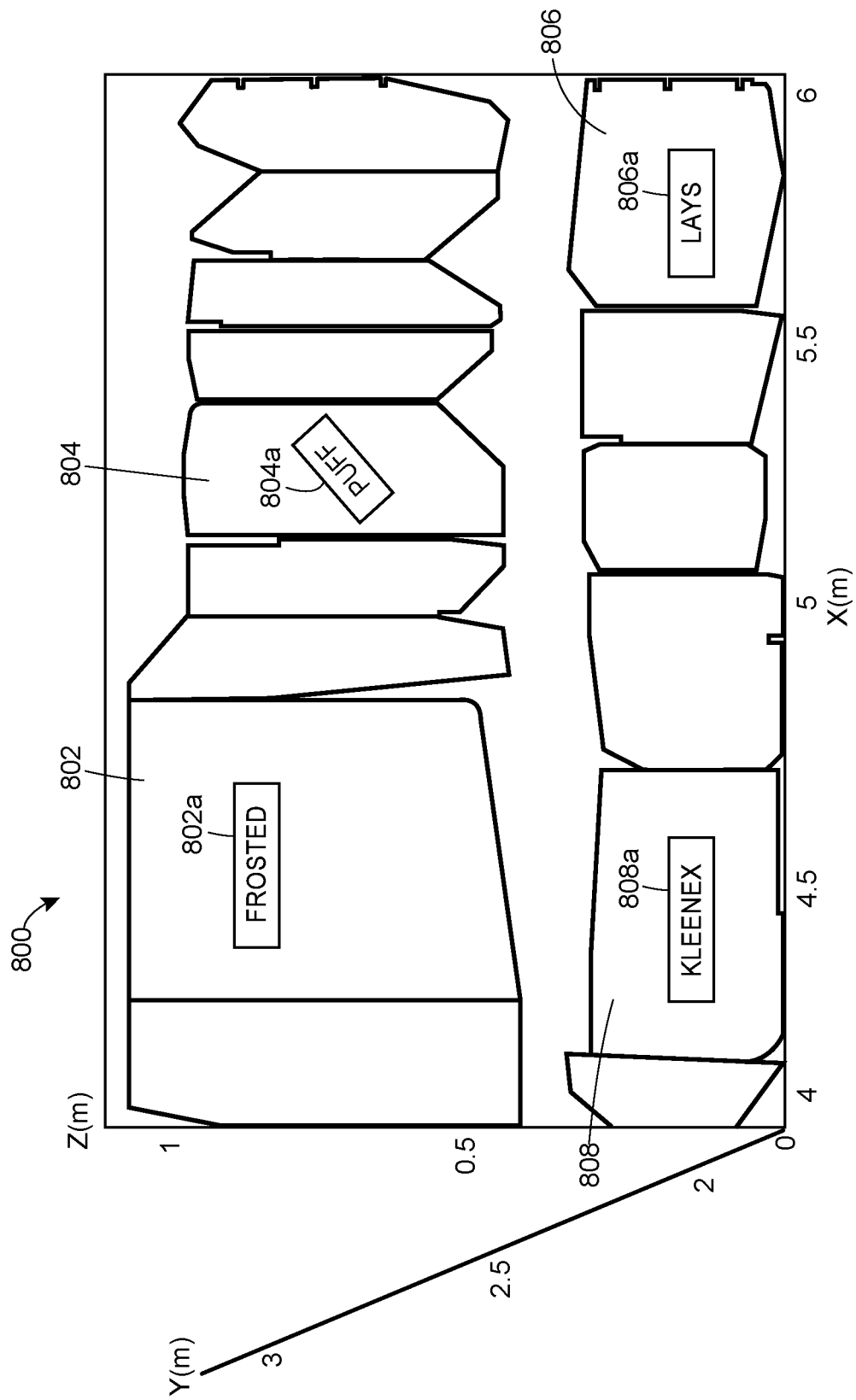
FIG. 8 illustrates exemplary text detection of an image depicting a merchandizing fixture.

FIG. 8 illustrates an example image 800 depicting a merchandizing fixture, similar to the image 700 in FIG. 7, where text detection techniques have been applied to identify text characters or text strings within the image. For example, the image 800 may include objects 802, 804, 806, 808. Within each of these objects 802, 804, 806, 808, the map building application 146 may identify text such as the text string "Frosted" 802a within object 802, the text string "Puff" 804a within object 804, the text string "Lays" 806a within object 806, and the text string "Kleenex" 808a within object 808. The map building application 146 may identify each text string by identifying a portion of an object within the image 800 which contains text using SWT, MSER, or a combination of these techniques. The map building application 146 may then extract the identified portion and using an OCR engine, may convert the extracted portion of the image 800 to a text string.

In this manner, the map building application 146 may determine the size and shape of an object as described with reference to FIG. 8 and text displayed on the object (e.g., "Frosted), all of which may be semantic cues for determining which retail product corresponds to the object. While each of the text strings 802a, 804a, 806a, 808a, appear to be single words, the text string may include several words or phrases, such as "Frosted Flakes," may include a portion of a word, such as "Kleen," or a single text character, such as "x." Each identified text string for an object may be compared to text strings in the templates of retail products to determine likelihoods that the object corresponds to the retail products in the template. For example, a template library may include tens, hundreds, or even thousands of templates of retail products. When comparing object 802 to the templates of retail products in the template library, 15 of the templates of retail products may include the text string "Frosted" 802a, for example. Accordingly, the likelihood that object 802 corresponds to one of the 15 retail products including the text string "Frosted" may be higher than the likelihood that the object 802 corresponds to the other retail products in the template library.

As mentioned above, the map building application 146 may also identify other visual characteristics within each object. For example, the map building application 146 may determine an average color within the boundaries of an object. The map building application 146 may also determine a color gradient within the boundaries of an object. For example, the center of an object may be dark, but may become lighter near the boundaries. While color may be filtered out and the image may be converted to grayscale to identify barcodes or boundaries of objects, the filter may be removed to determine color descriptors for the object. Style parameters for the object may also be identified including the stroke width of lines and/or curves on the object. While consistent stroke width may be used to identify text characters, an average stroke width may also be a visual characteristic. For example, some retail products may use very large letters or symbols while other retail products use much smaller letters or symbols. The stroke width of lines and/or curves on the object may be used to distinguish between retail products. Also, a tag, such as a barcode may be identified within an object in a similar manner as mentioned above for identifying tags on merchandizing fixtures.

Each of the visual descriptors, semantic cues, and/or other visual characteristics for the object may then be used to determine a retail product which corresponds to the object. In some embodiments, the map building application 146 may compare the visual descriptors, semantic cues, and/or other visual characteristics for the object to visual descriptors, semantic cues, and/or other visual characteristics in the templates of retail products to determine a likelihood that the object corresponds to each of the retail products. The retail product having the highest likelihood for the object or having a likelihood that exceeds a likelihood threshold may be identified as the retail product corresponding to the object.

Also in some embodiments, the map building application 146 may compare each visual descriptor and each semantic cue for the object to each visual descriptor and each semantic cue in the templates of retail products, individually. Based on the individual comparison, the map building application 146 may determine a likelihood that the object corresponds to each of the retail products based on an amount of similarity between the particular visual descriptor or semantic cue for the object and the visual descriptor or semantic cue for each retail product. The map building application 146 may then aggregate and/or combine the likelihoods based on each individual visual descriptor or semantic cue in any suitable manner to determine an overall likelihood that the object corresponds to each of the retail products. The retail product having the highest overall likelihood for the object or having an overall likelihood that exceeds a likelihood threshold may be identified as the retail product corresponding to the object.

For example, an object may have semantic cues which include a size of the object, a shape of the object, and a text string displayed on the object. The object may also have several visual descriptors which include keypoints within the object. The map building application 146 may compare the size of the object to the size of a bottle of Old Spice® body wash and determine there is a 50 percent likelihood that the object is Old Spice® body wash based on size. The map building application 146 may then compare the shape of the object to the shape of the bottle of Old Spice® body wash and determine there is a 30 percent likelihood that the object is Old Spice® body wash based on shape; may compare an "Old" text string displayed on the object to the text on the bottle of Old Spice® body wash and determine there is a 40 percent likelihood that the object is Old Spice® body wash based on the text string; and may compare the visual descriptors for the object to visual descriptors for the bottle of Old Spice® body wash and determine there is a 70 percent likelihood that the object is Old Spice® body wash based on the visual descriptors. Each of these likelihoods may be combined and/or aggregated in any suitable manner to determine an overall likelihood that the object is Old Spice® body wash.

These visual descriptors and semantic cues for the object may also be compared to visual descriptors and semantic cues for other retail products in the template library to determine overall likelihoods that the object corresponds to each of the retail products in the template library. In some embodiments, when a likelihood that the object corresponds to a retail product based on one of the visual descriptors or semantic cues is less than a threshold likelihood (e.g., one percent), the map building application 146 may determine that the object does not correspond to the retail product and may not compare the other visual descriptors and semantic cues for the object to the visual descriptors and semantic cues for the retail product.

To determine likelihoods that the object corresponds to each of the template of retail products in the template library based on visual descriptors and semantic cues for the object, the map building application 146 may apply various machine learning techniques. In one embodiment, the map building application 146 may employ a nearest neighbors algorithm including naïve Bayes nearest neighbor classifiers. For example, for an object or for several objects in an image, the map building application 146 may extract the visual descriptors which may be compared to a nearest neighbor visual descriptor from the template library (e.g., the visual descriptor in the template library that is the most similar to the visual descriptor from the object). Some visual descriptors from the template library may be visual descriptors in a vast majority of the retail products. These visual descriptors may not be as helpful in determining the retail product corresponding to the object as visual descriptors which are not present in many of the retail products. Accordingly, the likelihood that the object corresponds to a retail product based on a visual descriptor may decrease in proportion to the frequency that the visual descriptor occurs in each of the retail products in the template library. The map building application 146 may identify a nearest neighbor retail product in the template library by minimizing Equation 1.

$$\prod_{i=1}^{N} \|d_i - NN_S(d_i) + Dist_{NN_S(d_i)}\|^2; \qquad \text{Eq. 1}$$

In Equation 1, $d_1, \ldots d_N$ are the visual descriptors extracted by the map building application 146 from the object or from several objects in an image. $NN_S(d_i)$ is the nearest neighbor visual descriptor for visual descriptor $d_i$ in retail product S and $Dist_{NN_S(d_i)}$ is a score based on the number of times the nearest neighbor occurs in a training set normalized over all of the retail products in the template library. In this manner the nearest neighbor visual descriptor $NN_S(d_i)$ is selected which is the most similar to the visual descriptor for the object $d_i$ and which occurs the least frequently in a training set over all of the retail products in the template library.

The likelihood that the object having visual descriptors $d_i$, $d_N$ corresponds to a retail product having nearest neighbor visual descriptors $NN_S(d_i)$ $NN_S(d_N)$ may be determined based on the inverse of Equation 1. In some embodiments, semantic cues for the object may be compared to semantic cues in the template of a retail product in a similar manner as the visual descriptors (e.g., using a nearest-neighbors algorithm). In other embodiments, a semantic cue for the object such as text may be compared to text in the template of a retail product to identify the amount of matching text characters, words, or symbols. The likelihood that the object corresponds to the retail product based on the text may be determined according to the amount of matching text characters, words, or symbols. In any event, the likelihood that that object corresponds to a retail product based on the object's visual descriptors and the likelihood that the object corresponds to the retail product based on the object's semantic cues may be combined or aggregated in any suitable manner.

Figure 9:
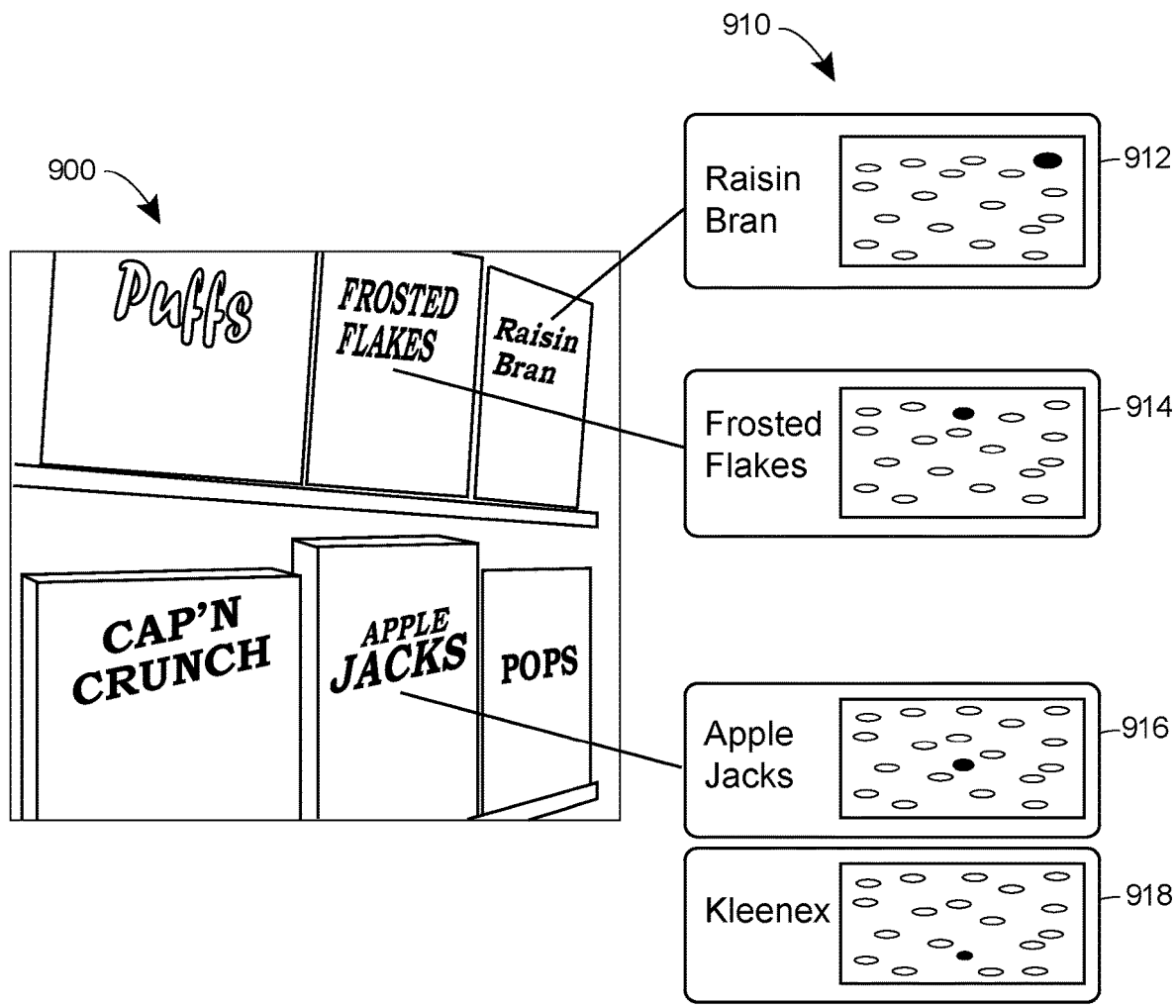
FIG. 9 illustrates exemplary heat maps generated for an image depicting a merchandizing fixture.

FIG. 9 illustrates an example image 900 captured by the autonomous vehicle 12 and analyzed by the map building application 146 of the server device to determine likelihoods that each of the objects in the image 900 correspond to the retail products in the template library. In some embodiments, the likelihoods may be determined using the nearest neighbor algorithm as described above. FIG. 9 also illustrates example heat maps 910 representing the likelihoods that each of the objects in the image 900 correspond to the retail products in the template library. A heat map may be a visual representation of the likelihood that each object or pixel location within the image 900 corresponds to one of the retail products in the template library. For example, for a particular retail product, a "hot" section of the heat map 910 (illustrated by orange and red colors) which corresponds to the image 900 may represent a high likelihood that the corresponding section of the image 900 corresponds to the retail product.

The heat maps may be generated by using the techniques mentioned above to identify objects using boundary segmentation, identify visual descriptors and/or semantic cues for the objects, and compare the visual descriptors and/or semantic cues for the objects to visual descriptors and/or semantic cues for templates of retail products in a template library. For a retail product template such as Raisin Bran 912, visual descriptors and/or semantic cues for each of the objects or pixel locations in the image 900 may be compared to the visual descriptors and/or semantic cues for Raisin Bran. When the visual descriptors and/or semantic cues for an object or pixel location in the image 900 are very similar to the visual descriptors and/or semantic cues for Raisin Bran, the likelihood that the object corresponds to Raisin Bran may be high, and the location of the object within the heat map 912 may include dark red and orange colors. On the other hand, the location of the object within the heat map 912 may include blue and light blue colors when the visual descriptors and/or semantic cues for object are dissimilar to the visual descriptors and/or semantic cues for Raisin Bran.

The heat maps 910 may include a heat map for Raisin Bran 912, a heat map for Frosted Flakes 914, a heat map for Apple Jacks® 916, and a heat map for Kleenex® 918. The heat map for Raisin Bran 912 may indicate that the upper right hand corner of the image 900 includes an object having the highest likelihood of being Raisin Bran. As shown in the image 900, the upper right hand corner is a box of Raisin Bran, and therefore, the map building application 146 appears to correctly identify the object in the upper right hand corner of the image 900 as Raisin Bran, based on the visual descriptors and/or semantic cues for the object. This also appears to be the case for Frosted Flakes, based on the heat map for Frosted Flakes 914. For the object in the lower middle section of the image 900, both the heat maps for Apple Jacks® 916 and Kleenex® 918 include dark red spots in the portions of the heat maps 916, 918 corresponding to the object. This may indicate that there is a high likelihood that the object in the lower middle section of the image 900 is Apple Jacks® and a high likelihood that the object is Kleenex®. To determine which of the retail products the object corresponds to, the map building application 146 may identify a retail department for the area depicted in the image 900 or for a portion of the area depicted in the image 900. The retail product corresponding to the object in the lower middle section of the image 900 may be determined based on the retail department associated with the lower middle section of the image 900. This is described in more detail below.

While four heat maps are included in FIG. 9 this is merely for ease of illustration only. Each image 900 may be compared to each of the retail product templates in the template library, and accordingly there may be hundreds or thousands of heat maps corresponding to hundreds or thousands of retail product templates in the template library. Alternatively, the map building application 146 may not generate heat maps to represent likelihoods that an object within an image corresponds to a retail product within the template library. The map building application 146 may calculate likelihoods based on Equation 1, using another machine learning algorithm for comparing visual descriptors and/or semantic cues to classify objects, or in any other suitable manner. Additional machine learning algorithms for determining likelihoods that the object corresponds to each of the retail products in the template library may include naïve Bayes, clustering, random forests, boosting, decision trees, support vector machines, artificial neural networks, Gaussian process regression, etc.

Department Segmentation

As mentioned above, in addition to identifying objects within an image and determining likelihoods that the objects correspond to retail products based on a template comparison, the map building application 146 may identify retail departments within a retail area. The retail departments may be used to verify and/or correct the identification made by the map building application 146. More specifically, the retail departments may be used to adjust and correct the initial likelihoods determined from the template comparison. For example, if the map building application 146 identifies an object as a particular type of stereo system and the retail department for the object is cosmetics, the map building application 146 may adjust the likelihoods determined for the object, such that a retail product associated with cosmetics is identified. In this manner, the initially determined likelihoods for an object may be corrected based on the retail department for the object. In another example, if the map building application 146 identifies the object as a particular type of stereo system and the retail department for the object is electronics, the likelihood that the object is a stereo system may remain the same or may be increased further to ensure that the identified retail product for the object is the stereo system.

To identify retail departments within a retail area, the map building application 146 may divide merchandizing fixtures in the retail area into several segments each corresponding to a different retail department. The segments may be determined in several ways. In some embodiments, the retail area may be segmented in one dimension (e.g., lengthwise), because objects directly above or behind an object in a merchandizing fixture may correspond to the same retail department. In other embodiments, the retail area may be segmented in any suitable number of dimensions.

The map building application 146 may initially segment a merchandizing fixture based on the most likely retail products corresponding to the objects in the merchandizing fixture. Each retail product may have an associated retail department. For example, Apple Jacks® may be associated with the cereal department. As a result, the location of an object which most likely corresponds to Apple Jacks® may be assigned to the cereal department. The map building application 146 may initially segment each of the merchandizing fixtures in this manner, based on retail departments associated with the retail products which most likely correspond to the objects in the merchandizing fixtures. In some embodiments, the map building application 146 may initially segment a merchandizing fixture based on retail departments identified from tags on the merchandizing fixtures. For example, as mentioned above, the tags may be analyzed and decoded to determine a product identifier having product information including a retail department associated with the tag. The map building application 146 may initially segment the merchandizing fixture based on the retail departments associated with the tags.

In other embodiments, a merchandizing fixture may be initially segmented based on the location of the merchandizing fixture. For example, merchandizing fixtures located near the entrance of the retail area may be more likely to include a candy department than merchandizing fixtures located in the back of the retail area. The map building application 146 may retrieve historical data (e.g., from the database 150) indicating previous locations for retail departments and may initially segment the merchandizing fixture according to the historical data. In yet other embodiments, the map building application 146 may initially segment the merchandizing fixture based on a combination of the most likely retail products corresponding to objects in the merchandizing fixture, the tags on the merchandizing fixture, and the location of the merchandizing fixture.

In any event, the initial segmentation may be adjusted by identifying clusters of objects associated with the same retail department. For example, for an object A, the map building application 146 may identify several of object A's neighboring objects and the retail departments associated with object A's neighboring objects. If all of object A's neighboring objects are assigned to the same retail department or more than a predetermined threshold amount are assigned to the same retail department (e.g., more than 70 percent), the map building application 146 may assign the location for object A to the same retail department as object A's neighboring objects and adjust the segmentation accordingly. In other embodiments, the map building application 146 may assign the location for object A to a most frequently occurring retail department of object A's neighboring retail departments. For example, if five of object A's neighboring objects are associated with the cosmetics department, three of object A's neighboring objects are associated with the first aid department, and one of object A's neighboring objects is associated with the chips and snacks department, the map building application 146 may assign the location for object A to the cosmetics department.

The map building application 146 may perform this adjustment for each of the objects in each of the merchandizing fixtures in the retail area. In some embodiments, the retail departments associated with object A's neighboring objects may be weighted based on proximity of each neighboring object to object A. For example, if a neighboring object is immediately adjacent to object A, the retail department associated with the neighboring object may be weighted more heavily than another neighboring object which is not immediately adjacent to object A. The weighted amount of neighboring objects assigned to the same retail department may then be compared to the predetermined threshold amount.

For example, in the image 900 in FIG. 9, the map building application 146 may determine that the objects in the left section of the image 900 are associated with the cereal department, the objects in the right section of the image 900 are associated with the cereal department, and the object in the lower middle section is associated with a household department, because the most likely retail product associated with the object is Kleenex®. However, the map building application 146 may reassign the lower middle section of the image 900 to the cereal department, because each of the object's neighbors are associated with the cereal department. The map building application 146 may then determine the most likely retail product which is associated with the cereal department for the object in the lower middle section. As a result, the map building application 146 may change the retail product corresponding to the object in the lower middle section from Kleenex® to Apple Jacks®.

More specifically, the map building application 146 may initially determine that the likelihood the object in the lower middle section of the image 900 corresponds to Kleenex® is 58 percent. The map building application 146 may also initially determine that the likelihood the object corresponds to Apple Jacks® is 42 percent. After assigning the object to the cereal department, the likelihoods may be corrected to 46 percent and 54 percent for Kleenex® and Apple Jacks®, respectively. In some embodiments, dynamic programming techniques may be used to identify retail departments for segments of the merchandizing fixture.

Figure 10A:
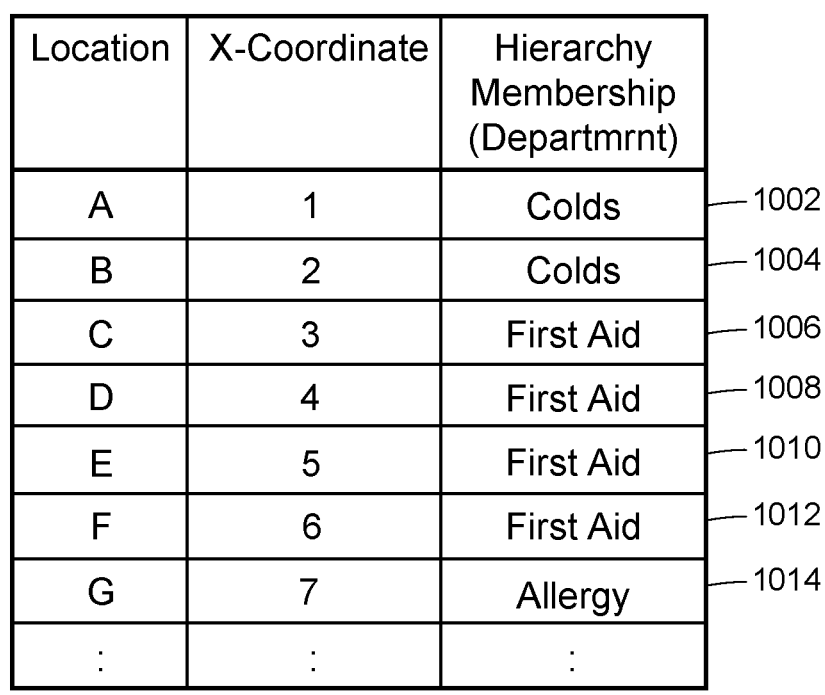
FIG. 10A illustrates an exemplary table indicating results of an automatic mapping of a store layout.

FIGS. 10A and 10B illustrate example mappings 1000, 1020 of a store layout which may be generated by the map building application 146 of the server device 102 and displayed on the server device 102 or another computing device. FIG. 10A illustrates an example table 1000 indicating the results of the mapping of the store layout. The example table 1000 may include several entries 1002-1014 indicating a retail department for an object, a location of the object within the retail area, and a specific set of coordinates for the location. For example, entry 1002 may indicate that a first object at Location A and X-Coordinate 1 is associated with the cold medicine department. In some embodiments, a key may be displayed which provides an exact location that corresponds to Location A or X-Coordinate 1 within the retail area. In this manner, a user may review the table 1000 to determine the locations of retail products within a retail area and the locations of various retail departments within the retail area.

FIG. 10B illustrates an example 3D map 1020 of the retail area 1022 including a set of (x,y,z) coordinates to indicate the positions of the identified retail products within the retail area 1022. In some embodiments, the store entrance may be located at coordinates (0,0,0). The 3D map 1020 may be annotated with several retail departments 1030-1040 within the retail area 1022 at their respective locations. For example, the cereal department 1040 may be located next to the medicine department 1038 and behind the cosmetics department 1034. The cereal department 1040 may span from x-y coordinates (900, 1750)-(1300, 1800). The 3D map 1020 may also include graphic representations of the retail products in each retail department. The graphic representations may be images of the retail products, may be the same shape as the retail product, or may be displayed in any suitable manner. In some embodiments, the graphic representations may include labels of their corresponding retail products. For example, the cereal department 1040 may include graphic representations of Cap'n Crunch® 1042, Raisin Bran 1044, Apple Jacks® 1046, Lucky Charms® 1048, Reese's Puffs® 1050, and Corn Pops® 1052. In this manner, a user may review the 3D map 1020 to identify the locations of various retail products within the retail area 1022.

Figure 11:
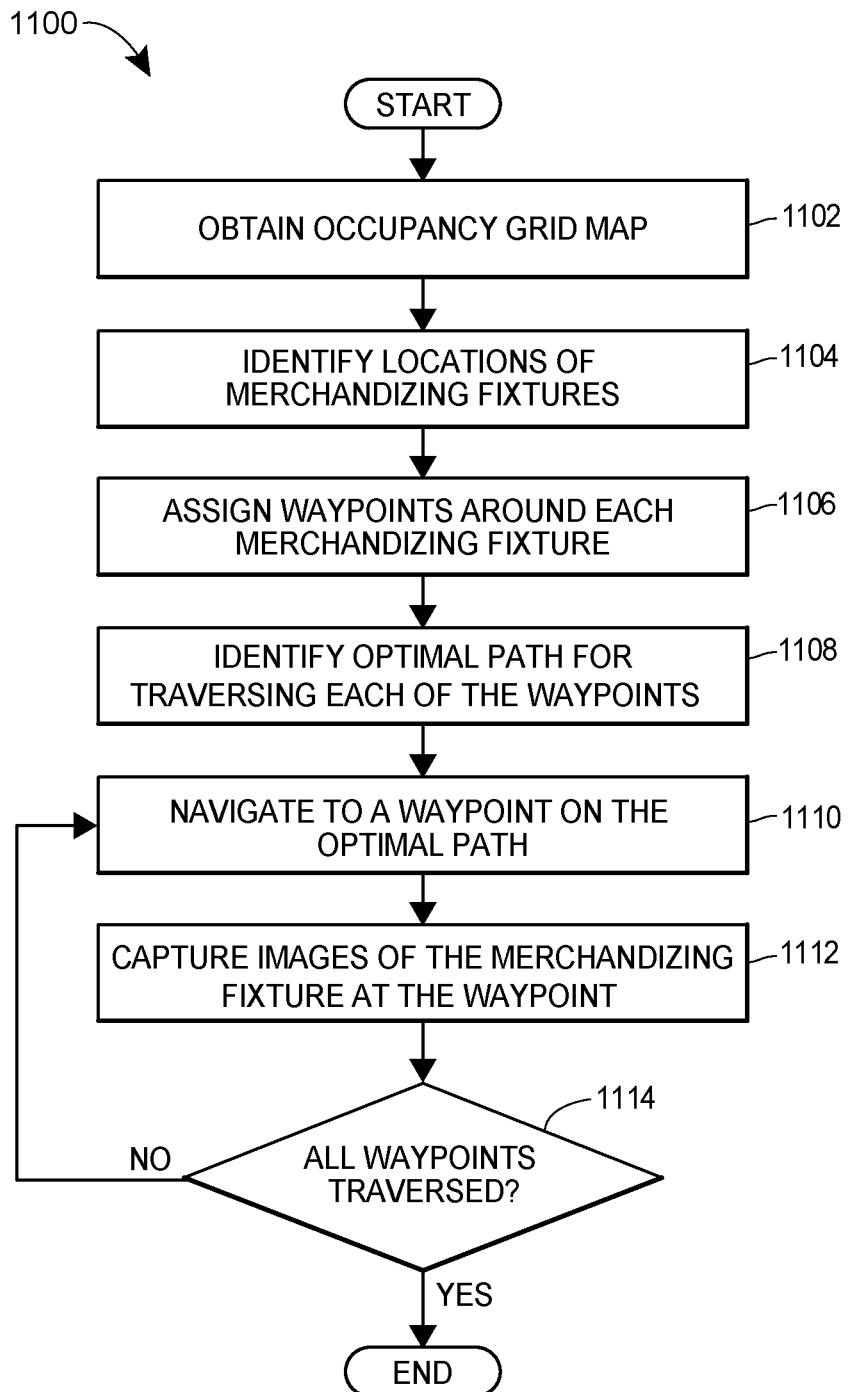
FIG. 11 illustrates a flow diagram representing an exemplary method for identifying an optimal path for traversing a retail area when mapping a store layout in accordance with the presently described embodiments.

FIG. 11 depicts a flow diagram representing an example method 1100 for identifying an optimal path for traversing a retail area when mapping a store layout. The method 1100 may be executed on the autonomous vehicle 12. In some embodiments, the method 1100 may be implemented in a set of instructions stored on a non-transitory computer-readable memory and executable on one or more processors of the autonomous vehicle 12. For example, the method 1100 may be performed by the movement control application 162 and/or the store imaging application 164 as shown in FIG. 2. In other embodiments, the method 1100 may be implemented by the server device 102, or a combination of these devices.

At block 1102, the autonomous vehicle 12 may obtain an occupancy grid map for a retail area which displays a 2D overhead view of each of the merchandizing fixtures in the retail area and their respective locations. In some embodiments, the autonomous vehicle 12 may obtain the occupancy grid map from the server device 102. For example, the server device 102 may store occupancy grid maps in the database 150, and may transmit an occupancy grid map to the autonomous vehicle 12 for a selected retail location. The autonomous vehicle 12 may provide the selected retail location to the server device 102 or may transmit a current location of the autonomous vehicle 12 and the server device 102 may identify a selected retail location based on the current location of the autonomous vehicle 12.

In other embodiments, the autonomous vehicle 12 may generate the occupancy grid map. For example, the autonomous vehicle 12 may traverse the retail area without having a pre-stored map of the retail area. Using the laser scanning device 16 for example, the autonomous vehicle 12 may identify objects to avoid in the retail area, such as merchandizing fixtures, shopping carts, people, etc. The autonomous vehicle 12 may also determine locations within the retail area using motion sensors and may capture images at the various location to generate the occupancy grid map.

The movement control application 162 in the autonomous vehicle 12 may then analyze the occupancy grid map to identify the locations of the merchandizing fixtures (block 1104). For example, the movement control application 162 may identify the locations around the perimeter of each of the merchandizing fixtures according to the occupancy grid map. The locations around the perimeter of each of the merchandizing fixtures may be used to identify an optimal path for traversing the retail area. For example, the movement control application 162 may identify an optimal path for traversing the entire retail area to capture images of each of the merchandizing fixtures in the retail area while covering the shortest amount of distance and/or time.

To identify an optimal path, the movement control application 162 may assign several waypoints around the perimeter of each of the merchandizing fixtures (block 1106). In some embodiments, each waypoint may be a threshold distance (e.g., 0.3 meters, 0.6 meters, etc.) from the perimeter of the corresponding merchandizing fixture. The movement control application 162 may obtain a threshold size for each of the images and may determine the threshold distance away from the perimeter of the merchandizing fixtures based on the threshold size. For example, the threshold size of a merchandizing fixture in an image may be in proportion to the distance between the autonomous vehicle 12 and the merchandizing fixture. The movement control application 162 may also identify a threshold spacing for adjacent waypoints to minimize the number of waypoints while ensuring that the images captured at the assigned waypoints can be combined to display an entire merchandizing fixture.

After assigning the waypoints around the perimeter of each merchandizing fixture in the retail area, the movement control application 162 may identify the optimal path for navigating to each of the waypoints in the retail area according to the shortest total distance and/or time (block 1108). The optimal path may be identified by assigning a cost to each pair of waypoints based on the distance between the waypoints. For every permutation involving all of the waypoints, the movement control application 162 may calculate the total cost for the permutation by aggregating the costs of the pairs of waypoints in the permutation. For example, if the retail area includes three waypoints, A-C, the movement control application 162 may calculate the total cost for the permutation of waypoint A to waypoint B to waypoint C by aggregating the cost from waypoint A to waypoint B and the cost from waypoint B to waypoint C. The permutation having the least total cost may be the optimal path for navigating to each of the waypoints in the retail area. In other embodiments, the movement control application 162 may employ a Concorde TSP solver to identify the path having the least total cost.

In any event, the movement control application 162 may then transmit control signals to cause the autonomous vehicle 12 to navigate to the first waypoint on the optimal path (block 1110). The store imaging application 164 of the autonomous vehicle 12 may capture images of the merchandizing fixture at the first waypoint (block 1112). In some embodiments, the store imaging application 164 may transmit the captured images to the server device 102 when the images are captured or may transmit all of the captured images to the server device 102 after reaching the final waypoint. After the images have been captured, the movement control application 162 may navigate to the next waypoint on the optimal path (block 1114) until all of the waypoints have been traversed.

Figure 12:
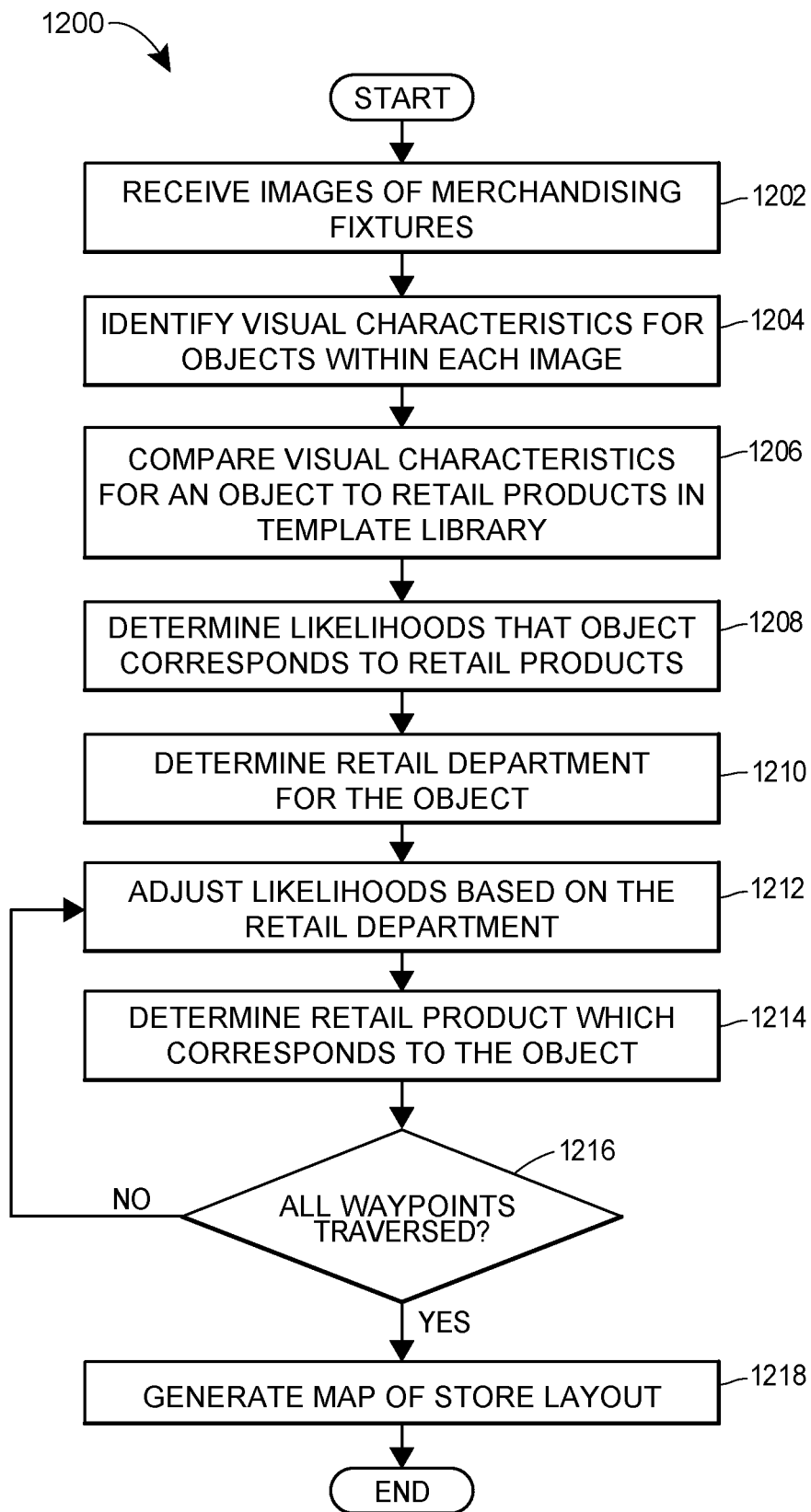
FIG. 12 illustrates a flow diagram representing an exemplary method for automatically mapping a store layout using soft object recognition in accordance with the presently described embodiments.

FIG. 12 depicts a flow diagram representing an example method 1200 for automatically mapping a store layout using soft object recognition. The method 1200 may be executed on the server device 102 In some embodiments, the method 1200 may be implemented in a set of instructions stored on a non-transitory computer-readable memory and executable on one or more processors of the server device 102 For example, the method 1200 may be performed by the map building application 146 as shown in FIG. 2. In other embodiments, the method 1200 may be implemented by the autonomous vehicle 12, or a combination of these devices.

At block 1202, the server device 102 may receive 3D images of merchandizing fixtures in a retail area as well as the location of each 3D image, the size of the area depicted in the captured image (e.g., a height and width), and depth information for the captured image. In some embodiments, the server device 102 may receive 3D image data represented as RGB-D sensor data.

The map building application 146 of the server device 102 may identify visual characteristics of objects on the merchandizing fixtures (block 1204). For example, the map building application 146 may perform boundary segmentation to identify boundaries for objects within a 3D image. Visual characteristics within the boundaries of an object may be identified includes semantic cues such as the size of the object, the shape of the object, text displayed on the object, a tag displayed on the object, etc., visual descriptors such as a stable, high-contrast region of the object, and/or other visual characteristics such as stroke widths for lines on the object, etc.

Each of these visual descriptors and/or semantic cues may be compared to visual descriptors and/or semantic cues for templates of retail products in a template library (block 1206). For example, the template library may include a template for Old Spice® body wash. The size and shape of the object may be compared to the size and shape for the template of Old Spice® body wash. Additionally, text characters on the object may be compared to text characters in the template for Old Spice® body wash. Visual descriptors for the object may also be compared to visual descriptors in the template. Based on the comparison, the map building application 146 may determine a likelihood that the object corresponds to the retail product (block 1208). This may be repeated for each of the templates of retail products in the template library to determine several likelihoods. In some embodiments, the map building application 146 may determine that the retail product having the highest likelihood is the retail product or the most likely retail product corresponding to the object.

The map building application 146 may also determine a retail department for the object (block 1210). In some embodiments, the map building application 146 may divide merchandizing fixtures in the retail area into several segments each corresponding to a different retail department. The segments may be determined in several ways. In some embodiments, the retail area may be segmented in one dimension (e.g., lengthwise), because objects directly above or behind an object in a merchandizing fixture may correspond to the same retail department. In other embodiments, the retail area may be segmented in any suitable number of dimensions.

The map building application 146 may segment a merchandizing fixture based on retail departments identified from tags on the merchandizing fixtures. For example, as mentioned above, the tags may be analyzed and decoded to determine a product identifier having product information including a retail department associated with the tag. The map building application 146 may segment the merchandizing fixture based on the retail departments associated with the tags.

The map building application 146 may also determine a retail department for the object based on the retail departments for the object's neighbors in the merchandizing fixture. For example, for an object A, the map building application 146 may identify several of object A's neighboring objects and the retail departments associated with object A's neighboring objects. If all of object A's neighboring objects are assigned to the same retail department or more than a predetermined threshold amount are assigned to the same retail department (e.g., more than 70 percent), the map building application 146 may assign the location for object A to the same retail department as object A's neighboring objects.

The map building application 146 may then adjust the likelihoods that the object corresponds to the retail products in the template library based on the retail department for the object (block 1212). For example, if the retail department for the object is soda and the most likely retail product for the object is an electronic device, the likelihoods may be corrected so that the most likely retail product for the object is a type of soda, such as Pepsi®. The map building application 146 may determine a retail product for the object which is the most likely retail product for the object based on the adjusted likelihoods (block 1214). If a retail product has been determined for all of the objects in all of the merchandizing fixtures in the retail area, the map building application 146 may generate a map of the store layout (block 1218) based on the retail products for each of the objects and their respective locations within the retail area. Otherwise, the map building application 146 identifies visual descriptors and/or semantic cues for another object or another image depicting a portion of the retail area (block 1204).

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

We claim:

1. A computer-implemented method for automatically mapping a store layout, the method executed by one or more processors programmed to perform the method, the method comprising:
   receiving, at the one or more processors, a three-dimensional image depicting one or more merchandizing fixtures within a retail area;
   identifying, by the one or more processors, visual characteristics within an object on the one or more merchandizing fixtures;
   determining, by the one or more processors, likelihoods that the object corresponds to a plurality of retail products by comparing the visual characteristics of the object to visual characteristics for each of the plurality of retail products;
   determining, by the one or more processors, distances from the object to retail products neighboring the object;
   identifying, by the one or more processors, retail departments corresponding to the retail products neighboring the object;
   determining, by the one or more processors, a retail department for the object based on the distances from the object to the retail products neighboring the object;
   adjusting, by the one or more processors, the likelihoods that the object corresponds to the plurality of retail products by comparing the retail department for the object to retail departments for the plurality of retail products;
   determining, by the one or more processors, a retail product for the object having a highest adjusted likelihood of the adjusted likelihoods that the object corresponds to the plurality of retail products; and
   generating, by the one or more processors, a map of a store layout for the retail area including an indication of the determined retail product within the retail area.

2. The method of claim 1, wherein determining a retail department for the object includes:
   determining, by the one or more processors, the retail department for the object based on a most frequently occurring retail department of the retail departments.

3. The method of claim 1, wherein determining a retail department for the object further includes:
   identifying, by the one or more processors within the three-dimensional image, one or more tags corresponding to objects neighboring the object; and
   analyzing, by the one or more processors, the one or more tags to identify retail departments.

4. The method of claim 1, wherein identifying visual characteristics within an object includes:
   identifying, by the one or more processors, boundaries of the object within the three-dimensional image; and
   identifying, by the one or more processors, the visual characteristics within the boundaries of the object.

5. The method of claim 4, wherein identifying visual characteristics within the boundaries of the object includes:
   identifying, by the one or more processors, text characters within the object using stroke width transform (SWT) techniques; and
   identifying, by the one or more processors, a text string based on the text characters using optical character recognition (OCR) techniques;
   wherein determining likelihoods that the object corresponds to the plurality of retail products based on the visual characteristics of the object further includes:

comparing, by the one or more processors, the text string to text strings corresponding to templates of the plurality of retail products; and determining, by the one or more processors, the likelihoods that the object corresponds to the plurality of retail products based on the comparison.

6. The method of claim 4, wherein identifying visual characteristics within the boundaries the object includes:

identifying, by the one or more processors, a size and shape of the object;

wherein determining likelihoods that the object corresponds to the plurality of retail products based on the visual characteristics of the object further includes:

comparing, by the one or more processors, the size and shape of the object to templates of the plurality of retail products; and determining, by the one or more processors, the likelihoods that the object corresponds to the plurality of retail products based on the comparison.

7. The method of claim 1, wherein determining likelihoods that the object corresponds to the plurality of retail products based on the visual characteristics of the object further includes:

determining, by the one or more processors, a first likelihood that the object corresponds to one of the plurality of retail products by comparing a size and shape of the object to a size and shape for a template of the retail product;

determining, by the one or more processors, a second likelihood that the object corresponds to the retail product by comparing a text string in the object to a text string for the template of the retail product;

determining, by the one or more processors, a third likelihood that the object corresponds to the retail product by comparing style parameters for the object to style parameters for the template of the retail product; and combining, by the one or more processors, the first, second, and third likelihoods to determine an overall likelihood that the object corresponds to the retail product.

8. The method of claim 1, wherein determining a retail product for the object based on the likelihoods that the object corresponds to the plurality of retail products includes:

determining that the object corresponds to one of the plurality of retail products when at least one of: (i) the likelihood for the retail product exceeds a predetermined likelihood threshold or (ii) the likelihood for the retail product is a highest likelihood of the likelihoods for the plurality of retail products.

9. The method of claim 1, further comprising:

filtering, by the one or more processors, the one or more merchandizing fixtures from the three-dimensional image including:

identifying depth within the three-dimensional image; and filtering out one or more portions of the three-dimensional image having a depth which is less than a predetermined depth threshold.

10. The method of claim 1, further comprising:

displaying, by the one or more processors, the map of the store layout on a user interface.

11. A system for automatically mapping a store layout, the system comprising:

one or more processors, a non-transitory computer-readable memory coupled to the one or more processors, and storing thereon instructions that, when executed by the one or more processors, cause the system to:

receive a three-dimensional image depicting one or more merchandizing fixtures within a retail area;

identify visual characteristics within an object on the one or more merchandizing fixtures;

determine likelihoods that the object corresponds to a plurality of retail products by comparing the visual characteristics of the object to visual characteristics for each of the plurality of retail products;

determine distances from the object to retail products neighboring the object;

identify retail departments corresponding to the retail products neighboring the object;

determine a retail department for the object based on the distances from the object to the retail products neighboring the object;

adjust the likelihoods that the object corresponds to the plurality of retail products by comparing the retail department for the object to retail departments for the plurality of retail products;

determine a retail product for the object having a highest adjusted likelihood of the adjusted likelihoods that the object corresponds to the plurality of retail products; and generate a map of a store layout for the retail area including an indication of the determined retail product within the retail area.

12. The system of claim 11, wherein to determine a retail department for the object, the instructions cause the system to:

determine the retail department for the object based on a most frequently occurring retail department of the retail departments.

13. The system of claim 12, wherein to determine a retail department for the object, the instructions further cause the system to:

identify within the three-dimensional image, one or more tags corresponding to objects neighboring the object; and analyze the one or more tags to identify retail departments.

14. The system of claim 11, wherein to identify visual characteristics within the object, the instructions further cause the system to:

identify boundaries of the object within the three-dimensional image; and identify the visual characteristics within the boundaries of the object.

15. The system of claim 14, wherein to identify visual characteristics within the boundaries of the object, the instructions further cause the system to:

identify text characters within the object using stroke width transform (SWT) techniques; and identify a text string based on the text characters using optical character recognition (OCR) techniques;

wherein to determine likelihoods that the object corresponds to the plurality of retail products based on the visual characteristics of the object, the instructions cause the system to:

compare the text string to text strings corresponding to templates of the plurality of retail products; and determine the likelihoods that the object corresponds to the plurality of retail products based on the comparison.

16. The system of claim 14, wherein to identify visual characteristics within the boundaries of the object, the instructions further cause the system to:
  identify a size and shape of the object;
  wherein to determine likelihoods that the object corresponds to the plurality of retail products based on the visual characteristics of the object, the instructions cause the system to:
    compare the size and shape of the object to templates of the plurality of retail products; and
    determine the likelihoods that the object corresponds to the plurality of retail products based on the comparison.

17. The system of claim 11, wherein to determine likelihoods that the object corresponds to the plurality of retail products based on the visual characteristics of the object, the instructions cause the system to:
  determine a first likelihood that the object corresponds to one of the plurality of retail products by comparing a size and shape of the object to a size and shape for a template of the retail product;
  determine a second likelihood that the object corresponds to the retail product by comparing a text string in the object to a text string for the template of the retail product;
  determine a third likelihood that the object corresponds to the retail product by comparing style parameters for the object to style parameters for the template of the retail product; and
  combine the first, second, and third likelihoods to determine an overall likelihood that the object corresponds to the retail product.

18. The system of claim 11, wherein to determine a retail product for the object based on the likelihoods that the object corresponds to the plurality of retail products, the instructions cause the system to:
  determine that the object corresponds to one of the plurality of retail products when at least one of: (i) the likelihood for the retail product exceeds a predetermined likelihood threshold or (ii) the likelihood for the retail product is a highest likelihood of the likelihoods of the plurality of retail products.

19. The system of claim 11, wherein the instructions cause the system to:
  filter the one or more merchandizing fixtures from the three-dimensional image including:
    identifying depth within the three-dimensional image; and
    filtering out one or more portions of the three-dimensional image having a depth which is less than a predetermined depth threshold.

20. The system of claim 11, wherein the instructions cause the system to:
  display the map of the store layout on a user interface.

* * * * *